United States Patent
Ebuchi et al.

(10) Patent No.: US 11,325,581 B2
(45) Date of Patent: May 10, 2022

(54) CONTROL SYSTEM FOR HYBRID VEHICLE

(71) Applicant: TOYOTA JIDOSHA KABUSHIKI KAISHA, Toyota (JP)

(72) Inventors: Hiroaki Ebuchi, Hadano (JP); Tatsuya Imamura, Okazaki (JP); Soichiro Shimura, Numazu (JP); Yoichiro Isami, Susono (JP); Takuya Hirata, Susono (JP); Shogo Sakatani, Susono (JP); Taiga Hagimoto, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 16/558,583

(22) Filed: Sep. 3, 2019

(65) Prior Publication Data
US 2020/0086847 A1 Mar. 19, 2020

(30) Foreign Application Priority Data

Sep. 19, 2018 (JP) .............................. JP2018-174627

(51) Int. Cl.
| | |
|---|---|
| *B60W 20/13* | (2016.01) |
| *B60K 6/26* | (2007.10) |
| *B60K 6/365* | (2007.10) |
| *B60W 50/00* | (2006.01) |
| *B60W 50/08* | (2020.01) |

(52) U.S. Cl.
CPC ............... *B60W 20/13* (2016.01); *B60K 6/26* (2013.01); *B60K 6/365* (2013.01); *B60W 50/0097* (2013.01); *B60W 50/082* (2013.01); *B60K 2006/268* (2013.01); *B60W 2510/244* (2013.01); *B60Y 2200/92* (2013.01); *B60Y 2400/47* (2013.01); *B60Y 2400/60* (2013.01); *B60Y 2400/73* (2013.01); *B60Y 2400/80* (2013.01)

(58) Field of Classification Search
CPC ............. B60W 20/13; B60W 50/0097; B60W 50/082; B60W 2510/244; B60K 6/26; B60K 6/365; B60K 2006/268; B60Y 2200/92; B60Y 2400/47; B60Y 2400/60; B60Y 2400/73; B60Y 2400/80
See application file for complete search history.

(56) References Cited

U.S. PATENT DOCUMENTS

| | | | |
|---|---|---|---|
| 2006/0289212 A1* | 12/2006 | Haruhisa ............... | B60W 20/13 180/65.235 |
| 2016/0368361 A1 | 12/2016 | Endo et al. | |
| 2017/0368942 A1 | 12/2017 | Endo et al. | |

FOREIGN PATENT DOCUMENTS

| | | | | |
|---|---|---|---|---|
| JP | 2009154723 A | * | 7/2009 | |
| JP | 2009298301 A | * | 12/2009 | ............. H02K 7/116 |
| JP | 2017-007437 A | | 1/2017 | |

(Continued)

*Primary Examiner* — Tisha D Lewis
(74) *Attorney, Agent, or Firm* — Oliff PLC

(57) ABSTRACT

A control system for a hybrid vehicle configured to start an engine promptly during propulsion in an electric vehicle mode. Electric power generation resulting from cranking the engine by a first motor is greater in the first electric vehicle mode compared to a second electric vehicle mode. A controller that is configured to determines whether an acceptable input power to an electric storage unit is smaller than a threshold value. If the acceptable input power to the electric storage unit is smaller than the threshold value, selection of the first electric vehicle mode is inhibited.

8 Claims, 21 Drawing Sheets

(56) References Cited

FOREIGN PATENT DOCUMENTS

JP            2018001795 A     1/2018
JP            2018098900 A  * 6/2018  ............... H02J 7/04

* cited by examiner

Fig.6

| Operating Mode | | CL1 | CL2 | B1 | MG1 | MG2 | ENG |
|---|---|---|---|---|---|---|---|
| HV Mode | HV-Low Mode | ● | – | – | G | M | ON |
| | HV-High Mode | – | ● | – | G | M | ON |
| | Fixed Mode | ● | ● | – | | M | ON |
| EV Mode | Dual-Motor Mode, EV-Low Mode | – | – | ● | M | M | OFF |
| | Dual-Motor Mode, EV-High Mode | – | ● | ● | M | M | OFF |
| | Single-Motor Mode | – | – | – | | M | OFF |

|  | CL4 | CL5 | B3 | B4 |
|---|---|---|---|---|
| 1st Operating Mode | — | — | ○ | — |
| 2nd Operating Mode | — | ○ | — | — |
| 3nd Operating Mode | ○ | — | ○ | — |
| 4nd Operating Mode | — | ○ | ○ | — |
| 5nd Operating Mode | ○ | ○ | — | — |
| 6nd Operating Mode | — | ○ | — | ○ |

CONTROL SYSTEM FOR HYBRID VEHICLE

CROSS-REFERENCE TO RELATED APPLICATIONS

The present disclosure claims the benefit of Japanese Patent Application No. 2018-174627 filed on Sep. 19, 2018 with the Japanese Patent Office, the disclosures of which are incorporated herein by reference in its entirety.

BACKGROUND

Field of the Disclosure

Embodiments of the present disclosure relate to the art of a control system for a hybrid vehicle in which a prime mover includes an engine and a motor.

Discussion of the Related Art

JP-A-2017-007437 describes a drive unit for a hybrid vehicle in which an output torque of an engine is distributed to a first motor and to an output side through a power split mechanism, and in which an output torque of a second motor driven by electricity supplied from the first motor is synthesized with the engine torque. In the hybrid vehicle taught by JP-A-2017-007437, an operating mode may be shifted by manipulating a first clutch and a second clutch of the drive unit. For example, a hybrid mode of the hybrid vehicle taught by JP-A-2017-007437 may be selected from a low mode in which a ratio of a power delivered to the output side to the power delivered to the first motor is relatively large, and a high mode in which the above-mentioned ratio is smaller. Given that an electric vehicle mode (to be abbreviated as the "EV mode" hereinafter) is selected, the hybrid vehicle taught by JP-A-2017-007437 is propelled by transmitting a drive torque from a drive motor to a second ring gear while stopping the engine. In the hybrid vehicle taught by JP-A-2017-007437, specifically, the electric vehicle mode may be established by engaging a brake while engaging one of the first clutch and the second clutch.

In the hybrid vehicle taught by JP-A-2017-007437, the EV mode may also be selected from a low mode and a high mode. Specifically, the EV-low mode is established by engaging the brake while engaging the first clutch, and the EV-High mode is established by engaging while engaging the second clutch.

According to the teachings of JP-A-2017-007437, if an engine is required to be started during propulsion in the EV mode, the first motor cranks the engine while regenerating electricity. In this case, a greater amount of the electricity is generated in the EV-low mode compared to the EV-high mode. That is, if a battery is almost fully charged and an input power to the battery is restricted during propulsion in the EV-low mode, the engine may not be started by the first motor. An upper limit value of the input power to the battery varies depending e.g., on a temperature and a state of charge level of the battery. Therefore, an improved control system is required to start the engine promptly in accordance with the upper limit value of the input power to the battery.

SUMMARY

Aspects of embodiments of the present disclosure have been conceived noting the foregoing technical problems, and it is therefore an object of the present disclosure to provide a control system for a hybrid vehicle configured to start an engine promptly during propulsion in an electric vehicle mode.

The control system according to the embodiment of the present disclosure is applied to a hybrid vehicle comprising: an engine; a first motor having a generating function; a differential mechanism comprising an input element connected to the engine, a reaction element connected to the first motor and an output element connected to a drive wheel; and an electric storage unit in which electricity generated by the first motor is accumulated. In the hybrid vehicle, an electric vehicle mode can be selected by manipulating the differential mechanism from: a first electric vehicle mode in which a ratio of a speed of the first motor to a speed of the drive wheel is a first predetermined ratio; and a second electric vehicle mode in which a ratio of the speed of the first motor to the speed of the drive wheel is a second predetermined ratio that is smaller than the first predetermined ratio. Electric power generation resulting from cranking the engine by the first motor in the first electric vehicle mode is greater than electric power generation resulting from cranking the engine by the first motor in the second electric vehicle mode. In order to achieve the above-explained objective, according to the embodiment of the present disclosure, the control system is provided with a controller that is configured to: select the first electric vehicle mode and the second electric vehicle mode depending on a speed of the hybrid vehicle; determine whether an acceptable input power to the electric storage unit is smaller than a threshold value, and inhibit selection of the first electric vehicle mode if the acceptable input power to the electric storage unit is smaller than the threshold value so that the engine is allowed to be cranked by the first motor in the electric vehicle mode.

In a non-limiting embodiment, the threshold value may be set to an electric power to be generated as a result of cranking the engine by the first motor in the first electric vehicle mode.

In a non-limiting embodiment, the threshold value may include a first threshold value and a second threshold value. Specifically, the first threshold value may be set to a current acceptable input power to the electric storage unit, and the second threshold value may be set to a predicted value of the acceptable input power to the electric storage unit that is greater than the first threshold value. The controller may be further configured to: estimate the predicted value of the acceptable input power to the electric storage unit when cranking the engine by the first motor in the first electric vehicle mode or the second electric vehicle mode; determine whether the predicted value of the acceptable input power to the electric storage unit is smaller than the second threshold value; and inhibit selection of the first electric vehicle mode if the predicted value of the acceptable input power to the electric storage unit is smaller than the second threshold value.

In a non-limiting embodiment, the controller may be further configured to: shift an operating mode from the first electric vehicle mode to the second electric vehicle mode while inhibiting the selection of the first electric vehicle mode, if the acceptable input power to the electric storage unit during propulsion in the first electric vehicle mode is smaller than the threshold value; and maintain the second electric vehicle mode if the acceptable input power to the electric storage unit during propulsion in the second electric vehicle mode is smaller than the threshold value.

In a non-limiting embodiment, the controller may be further configured to: determine the acceptable input power to the electric storage unit is smaller than the threshold value in a transient state of shifting the operating mode from the second electric vehicle mode to the first electric vehicle mode, and cancel the shifting operation to the first electric vehicle mode while returning the operating mode compulsory to the second electric vehicle mode, if the acceptable input power to the electric storage unit is smaller than the threshold value.

In a non-limiting embodiment, the electric storage unit may include two types of electric storage devices in which an output density and an energy density are different. In addition, the controller may be further configured to transfer electricity accumulated in one of the storage devices to the other one of the storage devices, if the acceptable input power to one of the electric storage devices is smaller than the threshold value when starting the engine.

In a non-limiting embodiment, the controller may be further configured to shift the operating mode to the first electric vehicle mode after the hybrid vehicle stops, when the hybrid vehicle is decelerated so that the operating mode is shifted from the second electric vehicle mode to the first electric vehicle mode.

In a non-limiting embodiment, the threshold value may vary in proportion to a change in the speed of the hybrid vehicle.

In a non-limiting embodiment, the hybrid vehicle may further comprise a second motor connected to the drive wheel in a torque transmittable manner. The differential mechanism may comprise: a first planetary gear unit that performs a differential action among a first input element, a first reaction element, and a first output element; a second planetary gear unit that performs a differential action among a second input element, a second reaction element, and a second output element; a first engagement device that selectively connects the first input element and the second input element; a second engagement device that selectively connects at least two elements of the second planetary gear unit to rotate the second planetary gear unit integrally; and a third engagement device that stops a rotation of the first input element. The first input element may be connected to the engine, the first reaction element may be connected to the first motor, the first output element may be connected to the second input element, and the second output element may be connected to a member of the drive wheel side.

Thus, electric power generation resulting from cranking the engine by the first motor in the first electric vehicle mode is greater than electric power generation resulting from cranking the engine by the first motor in the second electric vehicle mode. As described, according to the embodiment of the present disclosure, selection of the first electric vehicle mode is inhibited in a case that the acceptable input power to the electric storage unit is smaller than the threshold value. In this situation, if it is necessary to start the engine, the engine is started in the second electric vehicle mode in which the electricity to be generated as a result of starting the engine by the first motor is small. According to the embodiment of the present disclosure, therefore, the engine may be cranked promptly without damaging the electric storage unit.

The acceptable input power varies sequentially even when shifting the operating mode. Therefore, if the acceptable input power is expected to decrease during execution of the shifting operation of the operating mode scheduled in the future, the engine will not be allowed to be started in the first electric vehicle mode. In this case, selection of the first electric vehicle mode is also be inhibited to avoid such disadvantage so that the engine will be started in the second electric vehicle mode as necessary. According to the embodiment of the present disclosure, therefore, the engine will be cranked promptly in the second electric vehicle mode in response to an engine starting demand, without damaging the electric storage unit.

According to the embodiment of the present disclosure, the shifting operation from the second electric vehicle mode to the first electric vehicle mode is cancelled if the acceptable input power to the electric storage unit is smaller than the threshold value in a transient state of shifting the operating mode from the second electric vehicle mode to the first electric vehicle mode. According to the embodiment of the present disclosure, therefore, the engine may be cranked promptly in the second electric vehicle mode also during the transient state of shifting the operating mode from the second electric vehicle mode to the first electric vehicle mode.

Further, according to the embodiment of the present disclosure, the electricity accumulated in one of the storage devices is delivered to the other one of the storage devices, if the acceptable input power to one of the electric storage devices is smaller than the threshold value when starting the engine. According to the embodiment of the present disclosure, therefore, the acceptable input powers to both of the storage devices can be increased so that the engine is allowed to be started in the appropriate operating mode in accordance with the vehicle speed.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 6 is a table showing engagement states of engagement devices and operating conditions of the prime movers in each operating mode;

DETAILED DESCRIPTION OF THE PREFERRED EMBODIMENT(S)

Figure 1:
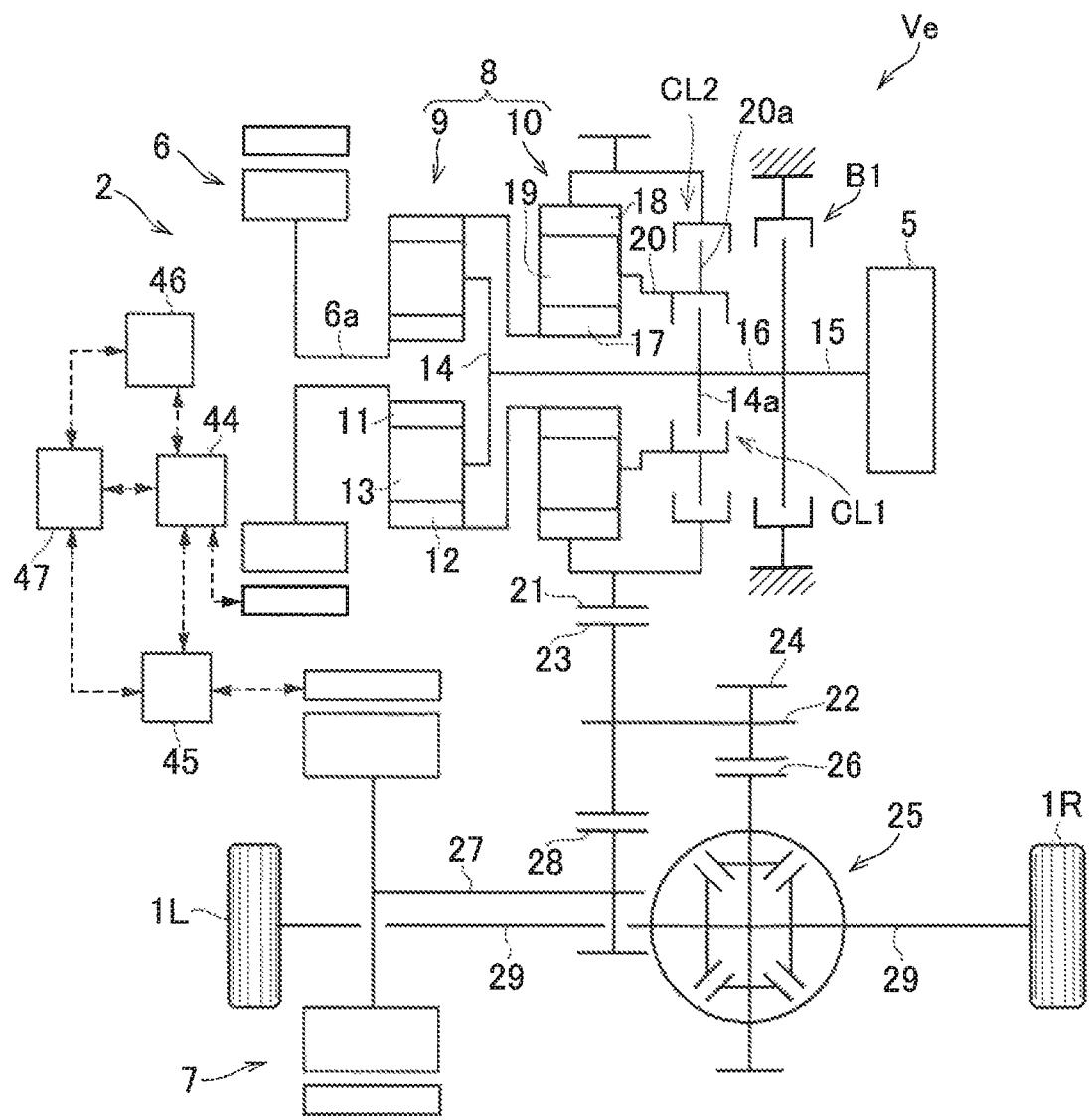
FIG. 1 is a skeleton diagram showing a first drive unit of the hybrid vehicle according to at least one embodiment of the present disclosure.
Figure 2:
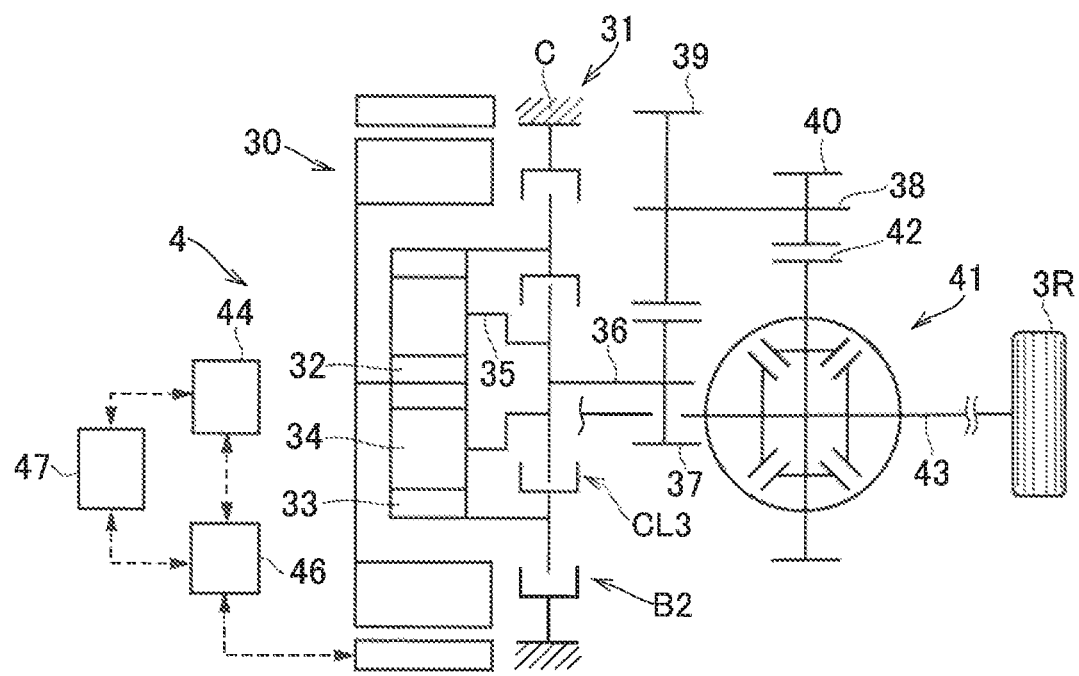
FIG. 2 is a skeleton diagram showing a second drive unit of the hybrid vehicle according to at least one embodiment of the present disclosure.

Preferred embodiments of the present application will now be explained with reference to the accompanying drawings. Referring now to FIGS. 1 and 2, there are shown the first embodiment of the hybrid vehicle according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The hybrid vehicle (as will be simply called the "vehicle" hereinafter) Ve is provided with an engine 5, a first motor (referred to as "MG1" in the drawings) 6 and a second motor (referred to as "MG2" in the drawings) 7. Specifically, the first motor 6 is a motor-generator having a generating function. In the vehicle Ve according to the first embodiment, a speed of the engine 5 is controlled by the first motor 6, and the second motor 7 is driven by electric power generated by the first motor 6 to generate a drive force for propelling the vehicle Ve. Optionally, the motor-generator having a generating function may also be employed as the second motor 7.

A power split mechanism 8 as a differential mechanism is connected to the engine 5. The power split mechanism 8 includes a power split section 9 that distributes an engine torque to the first motor 6 side and to an output side, and a transmission section 10 that alters a torque split ratio.

For example, a single-pinion planetary gear unit adapted to perform differential action among three rotary elements may be used as the power split section 9. That is, the power split section 9 serves as a first planetary gear unit of the embodiments. Specifically, the power split section 9 comprises: a sun gear 11; a ring gear 12 as an internal gear arranged concentrically with the sun gear 11; a plurality of pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a first reaction element, the ring gear 12 serves mainly as a first output element, and the carrier 14 serves mainly as a first input element.

An output shaft 15 of the engine 5 is connected to an input shaft 16 of the power split mechanism 8 connected to the carrier 14 so that output power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across the power split section 9. The transmission section 10 as a second planetary gear unit is interposed coaxially between the power split section 9 and the engine 5.

Specifically, the transmission section 10 is a single-pinion planetary gear unit comprising: a sun gear 17; a ring gear 18 as an internal gear arranged concentrically with the sun gear 17; plurality of pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21. Accordingly, the sun gear 17 serves as a second reaction element, the carrier 20 serves as a second input element, and the ring gear 18 serves as a second output element.

In order to use the power split section 9 and the transmission section 10 as a complex planetary gear unit, a first clutch CL1 as a first engagement device is disposed to selectively connect the carrier 20 of the transmission section 10 to the carrier 14 of the power split section 9. Specifically, a rotary disc 14a is fitted onto the input shaft 16, and the first clutch CL1 engages the rotary disc 14a selectively with the carrier 20 of the transmission section 10. For example, a wet-type multiple plate clutch or a dog clutch may be employed as the first clutch CL1. Otherwise, a normally stay clutch may also be employed as the first clutch CL1. An engagement state of the normally stay clutch is switched upon reception of the command signal, and the normally stay clutch stays in the current engagement state even if the signal transmission thereto is interrupted. Thus, in the first drive unit 2 shown in FIG. 1, the power split section 9 is connected to the transmission section 10 to serve as a complex planetary gear unit by engaging the first clutch CL1. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element. That is, the complex planetary gear unit is configured such that the input shaft 16, the output shaft 6a of the first motor 6, and the driven gear 23 are allowed to rotate in a differential manner.

A second clutch CL2 as a second engagement device is disposed to rotate the rotary elements of the transmission section 10 integrally. For example, a friction clutch, a dog clutch and a normally stay clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. Specifically, a rotary disc 20a is provided to be rotated integrally with the carrier 20, and the second clutch CL2 engages the rotary disc 20a selectively with the ring gear 18 of the transmission section 10.

The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each driveshaft 29.

In order to selectively stop a rotation of the output shaft 15 or the input shaft 16 for the purpose of delivering the drive torque generated by the first motor 6 to the front wheels 1R and 1L, a first brake B1 as a third engagement device is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the vehicle Ve to deliver power or torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (referred to as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; a plurality of pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a stationary member such as a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to an electric storage unit 47 including a lithium ion battery, a capacitor, and a solid-state battery. For example, when the first motor 6 is operated as a generator while establishing a reaction torque, an electric power generated by the first motor 6 may be supplied directly to the second motor 7 and the rear motor 30 without passing through the electric storage unit 47.

Figure 3:
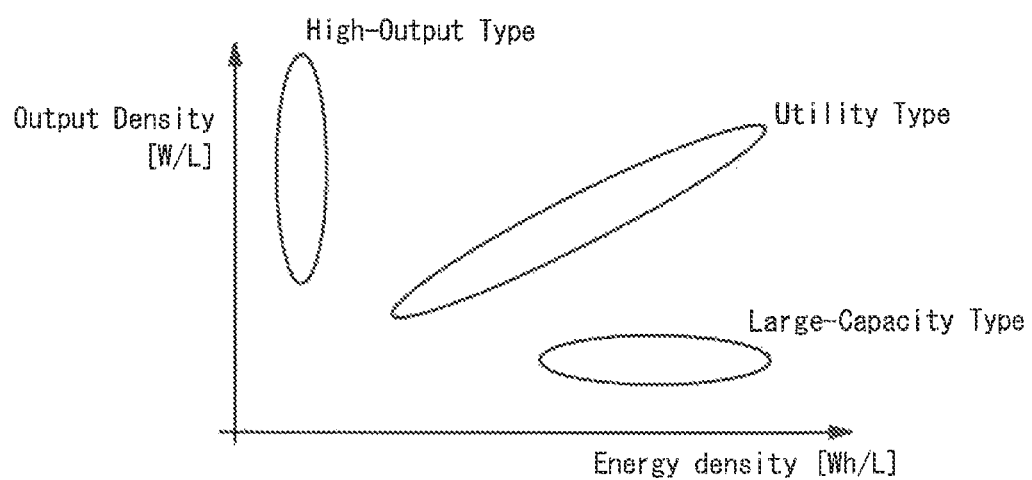
FIG. 3 is a graph indicating characteristics of an electric storage device.

As shown in FIG. 3, characteristics of the lithium ion battery, the capacitor, and the solid-state battery forming the electric storage unit 47 are different from one another. Specifically, an output density and an energy density per unit volume are different in the lithium ion battery, the capacitor and the solid-state battery. In other words, charging speeds, discharging speeds, and capacities of the lithium ion battery, the capacitor, and the solid-state battery are different from one another. As can be seen from FIG. 3, an output density of the capacitor is especially high, therefore, the capacitor may be categorized as a high-output type storage device. By contrast, an energy density of the solid-state battery is especially high, therefore, the solid-state battery may be categorized as a large-capacity type storage device. Since both of an output density and an energy density of the lithium ion battery are high, the lithium ion battery may be categorized as a utility-type storage device.

Figure 4:
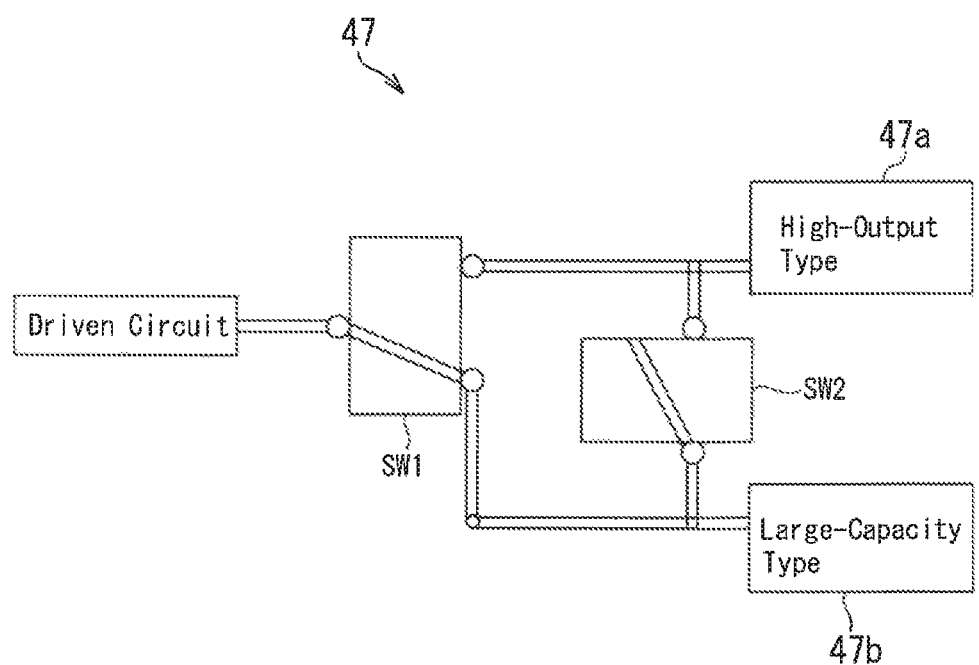
FIG. 4 is a schematic illustration showing an example of forming the electric storage device using a plurality of batteries.

The electric storage unit 47 may be formed by combining those storage devices arbitrarily according to need. As illustrated in FIG. 4, in the vehicle Ve, the electric storage unit 47 comprises: a high-output type storage device 47a such as a capacitor; a large-capacity type storage device 47b such as a solid-state battery; a first switch SW1 that selectively connects the high-output type storage device 47a and the large-capacity type storage device 47b to a driver circuit; and a second switch SW2 that selectively allows power exchange between the high-output type storage device 47a and the large-capacity type storage device 47b. For example, when an accelerator pedal (not shown) is depressed to generate a greater power, the first switch SW1 is switched to connect the high-output type storage device 47a to the driver circuit. By contrast, during cruising operation of the vehicle Ve, the first switch SW1 is switched to connect the large-capacity type storage device 47b to the driver circuit.

For example, when the high-output type electric storage device 47a is almost fully charged, in other words, when a state of charge (to be abbreviated as "SOC" hereinafter) level of the high-output type electric storage device 47a is higher than a predetermined level, the second switch SW2 is turned on to supply electricity from the high-output type electric storage device 47a to the large-capacity type storage device 47b thereby increasing acceptable input powers to both of the storage devices 47a and 47b. Thus, according to the example shown in FIG. 4, the different types of electric storage devices are selectively used depending on the situation. In the situation illustrated in FIG. 4, the driver circuit is connected to the large-capacity type storage device 47b through the first switch SW1, and the second switch SW2 is turned off. Here, it is to be noted that combination of the aforementioned batteries may be altered arbitrarily according to need.

Figure 5:
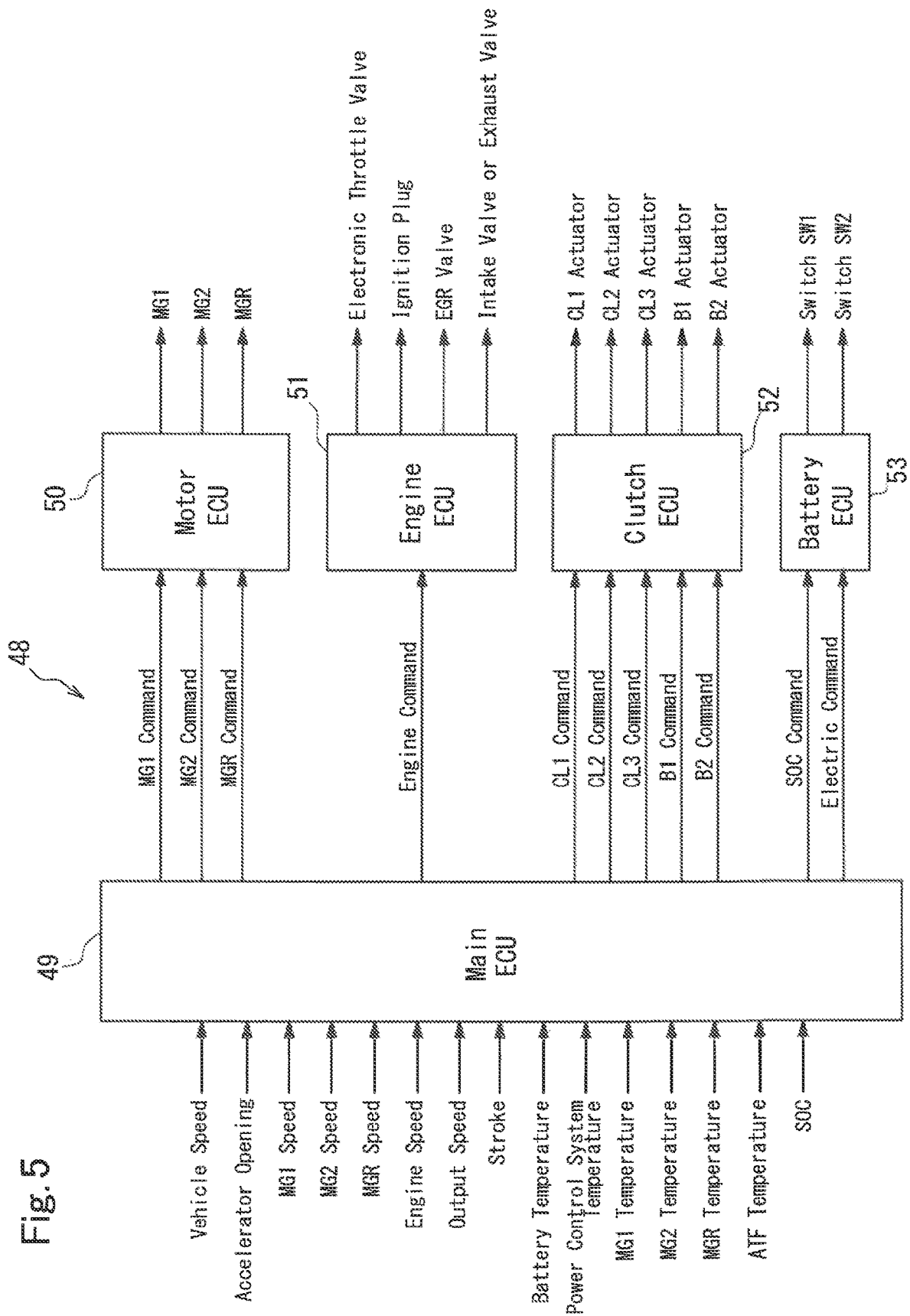
FIG. 5 is a block diagram showing a structure of an electronic control unit.

In order to control the first power control system 44, the second power control system 45, the third power control system 46, the engine 5, the clutches CL1, CL2, CL3, and the brakes B1, B2, the vehicle Ve is provided with an electronic control unit (to be abbreviated as the "ECU" hereinafter) 48 as a controller. The ECU 48 has a microcomputer as its main constituent, and as shown in FIG. 5, the ECU 48 comprises a main ECU 49, a motor ECU 50, an engine ECU 51, a clutch ECU 52, and a battery ECU 53.

The main ECU 49 is configured to execute a calculation based on incident data transmitted from sensors as well as maps and formulas installed in advance, and transmits a calculation result to the motor ECU 50, the engine ECU 51, the clutch ECU 52, and the battery ECU 53 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the counter shaft 22 of the transmission section 10; strokes of pistons of the clutches CL1, CL2, CL3, the brakes B1, and B2; a temperature of the electric storage unit 47; temperatures of the power control systems 44, 45, and 46; a temperature of the first motor 6; a temperature of the second motor 7; a temperature of the rear motor 30; a temperature of oil (i.e., ATF) lubricating the power split section 9 and the transmission section 10; a state of charge (to be abbreviated as the "SOC" hereinafter) level of the electric storage unit 47 and so on.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. In turn, command signals of torque transmitting capacities (including "0") of the clutches CL1, CL2, CL3, and the brakes B1, B2 are transmitted from the main ECU 49 to the clutch ECU 52. Further, command signals of an SOC level, a current value (and a voltage) of the electric storage unit 47 are transmitted from the main ECU 49 to the battery ECU 53.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the vehicle Ve, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49. Calculation results are transmitted from the engine ECU 51 to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

The battery ECU 53 calculates SOC levels of the high-output type storage device 47a and the large-capacity type storage device 47b of the electric storage unit 47, and current values (and integrated current values) supplied to the electric storage unit 47. Calculation results are transmitted from the battery ECU 53 to the first switch SW1 and the second switch SW2.

In the vehicle Ve, an operating mode may be selected from a hybrid mode (to be abbreviated as the "HV mode" hereinafter) in which the vehicle Ve is propelled by a drive torque generated by the engine 5, and an electric vehicle mode (to be abbreviated as the "EV mode" hereinafter) in which the vehicle Ve is propelled by drive torques generated by the first motor 6 and the second motor 7 without using the engine 5. The HV mode may be selected from a hybrid-low mode (to be abbreviated as the "HV-Low mode" hereinafter), a hybrid-high mode (to be abbreviated as the "HV-High mode" hereinafter), and a fixed mode. Specifically, in the HV-Low mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-High mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a dual-motor mode in which both of the first motor 6 and the second motor 7 generate drive torques to propel the vehicle Ve, and a single-motor mode in which only the second motor 7 generates a drive torque to propel the vehicle Ve. Further, the dual-motor mode may be selected from an electric vehicle-low mode (to be abbreviated as the "EV-Low mode" hereinafter) as a first electric vehicle mode in which a torque of the first motor 6 is multiplied by a relatively larger factor, and an electric vehicle-high mode (to be abbreviated as the "EV-High mode" hereinafter) as a second electric vehicle mode in which a torque of the first motor 6 is multiplied by a relatively smaller factor. In the single-motor mode, the vehicle Ve is powered only by the second motor 7, while engaging the first clutch CL1, while engaging the second clutch CL2, or while disengaging both of the first clutch CL1 and the second clutch CL2.

FIG. 6 shows engagement states of the first clutch CL1, the second clutch CL2, and the first brake B1, and operating conditions of the first motor 6, the second motor 7, and the engine 5 in each operating mode. In FIG. 6, "•" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 5 generates a drive torque, and "OFF" represents that the engine 5 does not generate a drive torque.

Rotational speeds of the rotary elements of the power split mechanism 8, and directions of torques of the engine 5, the first motor 6, and the second motor 7 in each operating mode are indicated in FIGS. 7 to 12. In the nomographic diagrams shown in FIGS. 7 to 12, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 7:
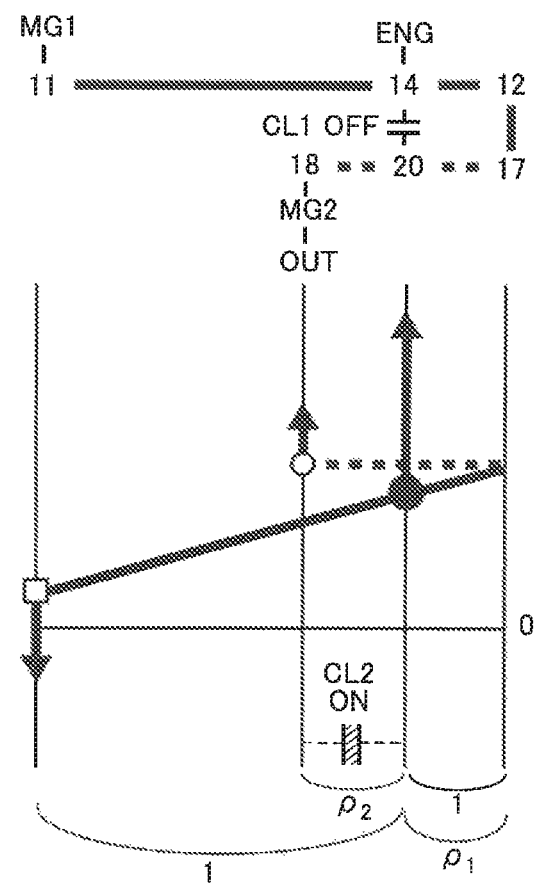
FIG. 7 is a nomographic diagram showing a situation in a HV-High mode.
Figure 8:
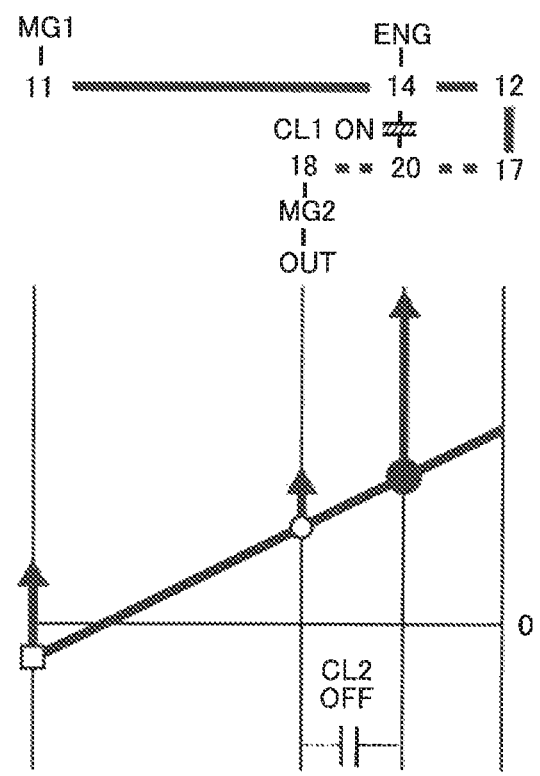
FIG. 8 is a nomographic diagram showing a situation in a HV-Low mode.

As indicated in FIG. 7, in the HV-High mode, the second clutch CL2 is engaged, and the engine 5 generates a drive torque while establishing a reaction torque by the first motor 6. As indicated in FIG. 8, in the HV-Low mode, the first clutch CL1 is engaged, and the engine 5 generates a drive torque while establishing a reaction torque by the first motor 6. In the HV-High mode and the HV-Low mode, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Specifically, the reaction torque established by the first motor 6 is governed by a split ratio of the torque delivered from the engine 5 to the first motor 6 side through the power split mechanism 8. Such split ratio between the torque delivered from the engine 5 to the first motor 6 side through the power split mechanism 8 and the torque delivered from the engine 5 to the ring gear 18 differs between the HV-Low mode and the HV-High mode.

Given that the torque delivered to the first motor 6 side is "1", a ratio of the torque applied to the ring gear 18 in the HV-Low mode may be expressed as "$1/(\rho 1 \cdot \rho 2)$", and a ratio of the torque applied to the ring gear 18 in the HV-High mode may be expressed as "$1/\rho 1$". In other words, given that the torque of the engine 5 is "1", a ratio of the torque of the engine 5 delivered to the ring gear 18 in the HV-Low mode may be expressed as "$1/(1-(\rho 1 \cdot \rho 2))$", and a ratio of the torque of the engine 5 delivered to the ring gear 18 in the HV-High mode may be expressed as "$1/\rho 1+1$". In the above expressions, "$\rho 1$" is a gear ratio of the power split section 9 (i.e., a ratio between teeth number of the ring gear 12 and teeth number of the sun gear 11), and "$\rho 2$" is a gear ratio of the transmission section 10 (i.e., a ratio between teeth number of the ring gear 18 and teeth number of the sun gear 17). Specifically, "$\rho 1$" and "$\rho 2$" are smaller than "1", respectively. That is, in the HV-Low mode, a ratio of the torque delivered to the ring gear 18 is increased in comparison with that in the HV-High mode. Here, when the speed of the engine 5 is increased by the torque generated by the engine 5, the output torque of the engine 5 may be calculated by subtracting a torque required to increase the speed of the engine 5 from a torque generated by the engine 5.

In the HV mode, the electric power generated by the first motor 6 is supplied to the second motor 7, and in addition, the electric power accumulated in the electric storage unit 47 is also supplied to the second motor 7 as necessary. In the vehicle Ve, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained.

Figure 9:
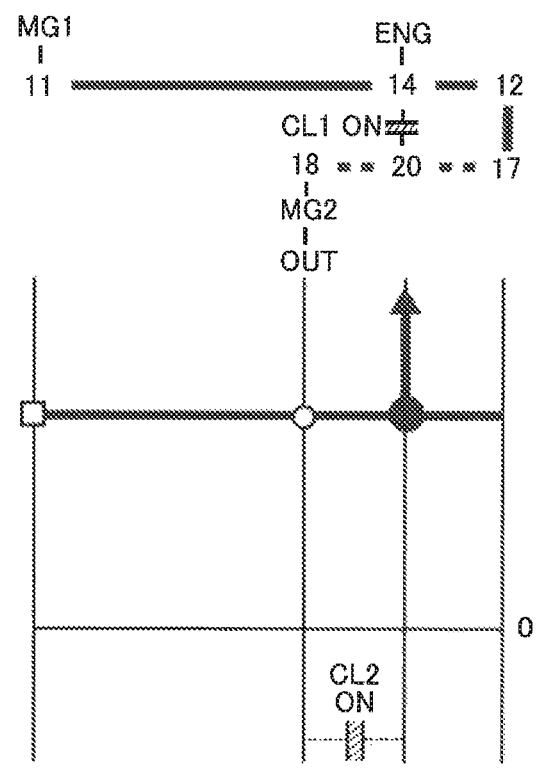
FIG. 9 is a nomographic diagram showing a situation in a fixed mode.

In the fixed mode, as indicated in FIG. 9, both of the first clutch CL1 and the second clutch CL2 are engaged so that all of the rotary elements in the power split mechanism 8 are rotated at same speeds. In other words, the output power of the engine 5 will not be translated into an electric energy by the first motor 6 and the second motor 7. For this reason, a power loss associated with such energy conversion will not be caused in the fixed mode and hence power transmission efficiency can be improved.

Figure 10:
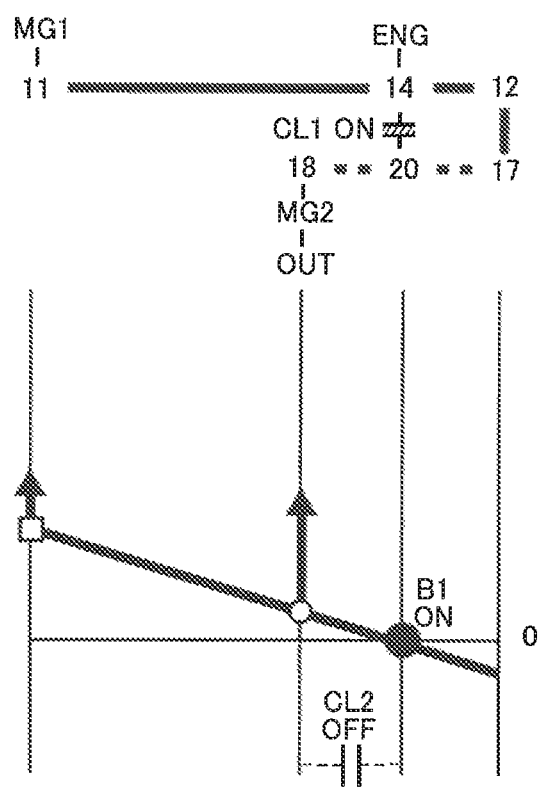
FIG. 10 is a nomographic diagram showing a situation in an EV-Low mode.
Figure 11:
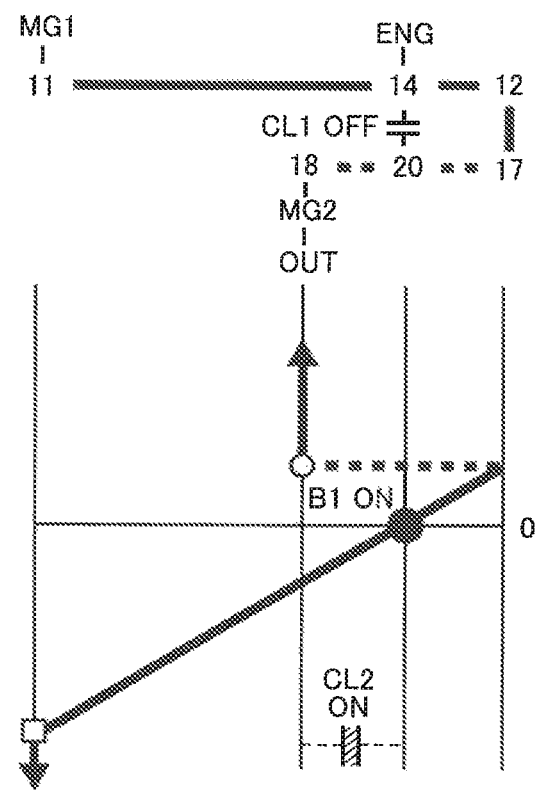
FIG. 11 is a nomographic diagram showing a situation in the EV-High mode.

As indicated in FIGS. 10 and 11, in the EV-Low mode and the EV-High mode, the first brake B1 is engaged, and the first motor 6 and the second motor 7 generates the drive torques to propel the vehicle Ve. As indicated in FIG. 10, in the EV-Low mode, the vehicle Ve is propelled by the drive torques generated by the first motor 6 and the second motor 7 while engaging the first brake B1 and the first clutch CL1. In this case, the first brake B1 also establishes a reaction torque to restrict a rotation of the output shaft 15 or the carrier 14. In the EV-Low mode, the first motor 6 is rotated in the same direction as the rotational direction of the engine 5 in the HV mode while generating torque in a direction to increase a rotational speed. As indicated in FIG. 11, in the EV-High mode, the vehicle Ve is propelled by drive torques generated by the first motor 6 and the second motor 7 while engaging the first brake B1 and the second clutch CL2. In this case, the first brake B1 establishes a reaction torque to restrict a rotation of the output shaft 15 or the carrier 14. In the EV-High mode, the first motor 6 is rotated in the opposite direction (i.e., in a reverse direction) to the rotational direction of the engine 5 in the HV mode, while generating torque in a direction to increase a rotational speed.

Figure 12:
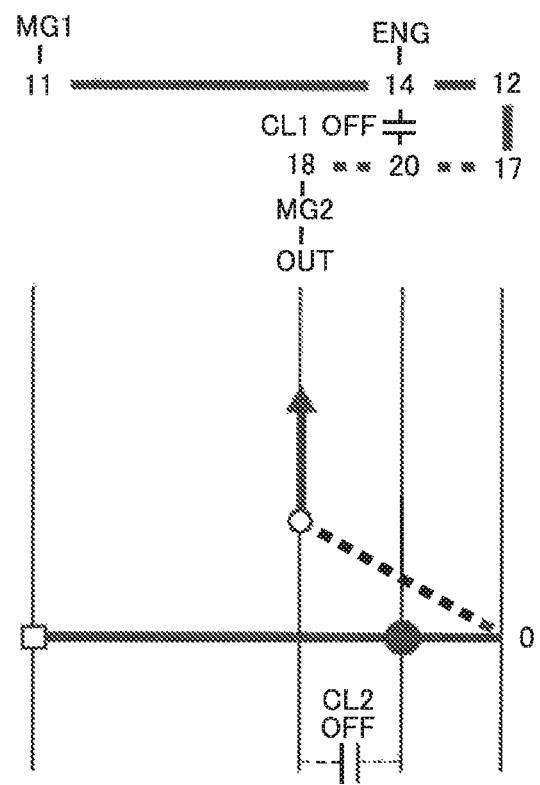
FIG. 12 is a nomographic diagram showing a situation in a single-motor mode.

In the EV-Low mode, a ratio of a rotational speed of the ring gear 18 of the transmission section 10 to a rotational speed of the first motor 6 is reduced smaller than that in the EV-High mode. That is, in the EV-Low mode, the rotational speed of the first motor 6 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the first drive unit shown in FIG. 1, the rotational speed of the ring gear 18 corresponds to a rotational speed of an output member, and the following explanation will be made on the basis that a gear ratio among each member from the ring gear 18 to the front wheels 1R and 1L are "1" for the sake of convenience. As indicated in FIG. 12, in the single-motor mode, only the second motor 7 generates a drive torque, and both of the first clutch CL1 and the second clutch CL2 are disengaged. In the single-motor mode, therefore, all of the rotary elements of the power split mechanism 8 are stopped. For this reason, the engine 5 and the first motor 6 will not be rotated passively, and hence the power loss can be reduced. Accordingly, the ratio of a rotational speed of the ring gear 18 to a rotational speed of the first motor 6 in the EV-Low mode corresponds to a first predetermined ratio of the embodiment, and the ratio of a rotational speed of the ring gear 18 to a rotational speed of the first motor 6 in the EV-High mode corresponds to a second predetermined ratio of the embodiment.

In the vehicle Ve, the operating mode is selected on the basis of an SOC level of the electric storage unit 47, a vehicle speed, a required drive force and so on. According to the embodiment, a selection pattern of the operating mode may be selected from a Charge Sustaining mode (to be abbreviated as the "CS mode" hereinafter) in which the operating mode is selected in such a manner as to maintain the SOC level of the electric storage unit 47 as far as possible, and a Charge Depleting mode (to be abbreviated as the "CD mode" hereinafter) in which the operating mode is selected in such a manner as to propel the vehicle Ve while consuming the electric power accumulated in the electric storage unit 47. Specifically, the CS mode is selected when the SOC level of the electric storage unit 47 is relatively low, and the CD mode is selected when the SOC level of the electric storage unit 47 is relatively high.

Figure 13:
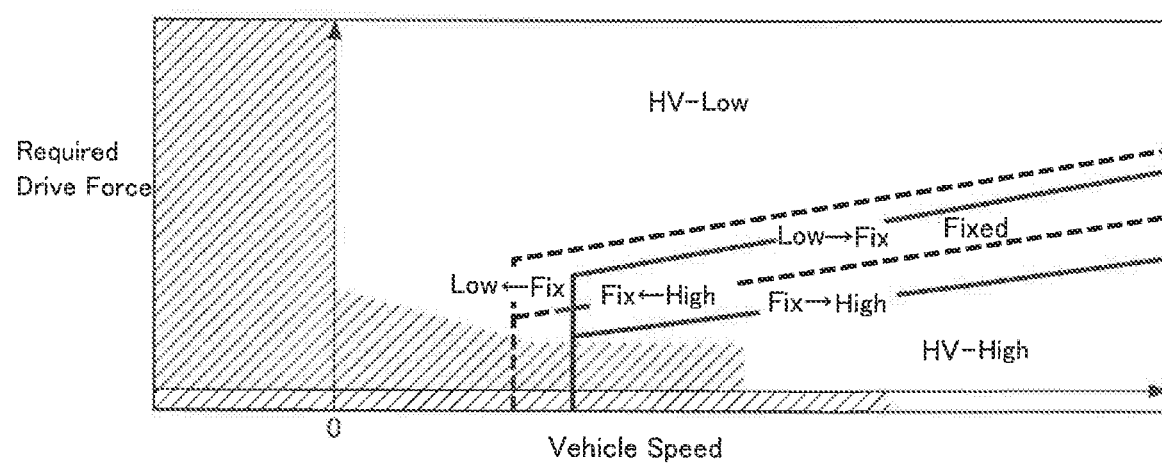
FIG. 13 shows a map for determining an operating mode during propulsion in a CS mode.

FIG. 13 shows an example of a map used to select the operating mode during propulsion in the CS mode. In FIG. 13, the vertical axis represents a required drive force, and the horizontal axis represents a vehicle speed. In order to select the operating mode of the vehicle Ve, the vehicle speed may be detected by a vehicle speed sensor, and the required drive force may be estimated based on an accelerator position detected by an accelerator sensor.

In FIG. 13, the hatched region is an area where the single-motor mode is selected. In the CS mode, the single-motor mode is selected when the vehicle Ve is propelled in a reverse direction irrespective of the required drive force, and when the vehicle Ve is propelled in a forward direction and the required drive force is small (or when decelerating). Such region where the single-motor mode is selected is determined based on specifications of the second motor 7 and the rear motor 30.

During forward propulsion in the CS mode, the HV mode is selected when the large drive force is required. In the HV mode, the drive force may be generated from a low speed range to a high speed range. When the SOC level of the electric storage unit 47 falls close to a lower limit level, therefore, the HV mode may be selected even if an operating point governed by the required drive force and the vehicle speed falls within the hatched region.

As described, the HV mode may be selected from the HV-Low mode, the HV-High mode, and the fixed mode. In the CS mode, specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between a region where the HV-Low mode is selected and a region where the HV-High mode is selected.

In the CS mode, the operating mode is shifted from the fixed mode to the HV-Low mode when the operating point is shifted across the "Low←Fix" line from right to left, or when the operating point is shifted across the "Low←Fix" line upwardly from the bottom. By contrast, the operating mode is shifted from the HV-Low mode to the fixed mode when the operating point is shifted across the "Low→Fix" line from left to right, or when the operating point is shifted across the "Low→Fix" line downwardly from the top. Likewise, the operating mode is shifted from the HV-High mode to the fixed mode when the operating point is shifted across the "Fix←High" line from right to left, or when the operating point is shifted across the "Fix←High" line upwardly from the bottom. By contrast, the operating mode is shifted from the fixed mode to the HV-High mode when the operating point is shifted across the "Fix→High" line from left to right, or when the operating point is shifted across the "Fix→High" line downwardly from the top.

Figure 14:
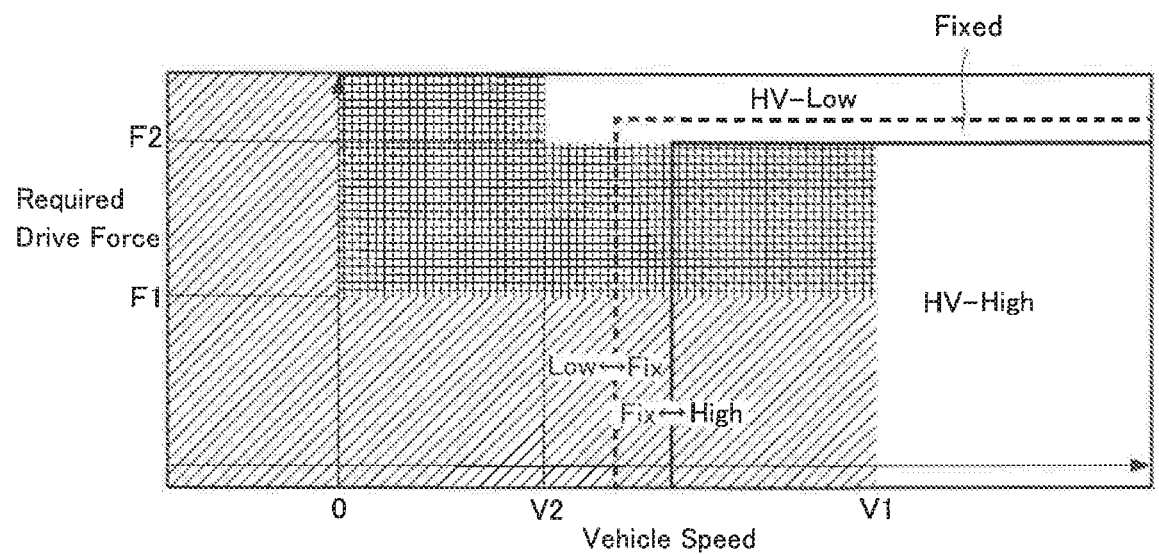
FIG. 14 shows a map for determining an operating mode during propulsion in a CD mode.

FIG. 14 shows an example of a map used to select the operating mode during propulsion in the CD mode. In FIG. 14, the vertical axis also represents the required drive force, and the horizontal axis also represents the vehicle speed.

In FIG. 14, the hatched region is also an area where the single-motor mode is selected. In the CD mode, the single-motor mode is also selected when the vehicle Ve is propelled in the reverse direction irrespective of the required drive force, and when the vehicle Ve is propelled in the forward direction and the required drive force is smaller than a first threshold force value F1 (or when decelerating). Such region where the single-motor mode is selected is also determined based on specifications of the second motor 7 and the rear motor 30.

During forward propulsion in the CD mode, the dual-motor mode is selected when the drive force larger than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, in the HV mode, the drive force may be generated from the low speed range to the high speed range. When the SOC level of the electric storage unit 47 falls close to the lower limit level, therefore, the HV mode may be selected even if the operating point falls within the regions where the single-motor mode and the dual-motor mode are selected.

In the CD mode, the HV-Low mode is also selected when the vehicle speed is relatively low and the required drive force is relatively large, the HV-High mode is also selected when the vehicle speed is relatively high and the required drive force is relatively small, and the fixed mode is also selected when the operating point falls between the region where the HV-Low mode is selected and the region where the HV-High mode is selected.

In the CD mode, the operating mode is shifted between the fixed mode and the HV-Low mode when the operating point is shifted across the "Low↔Fix" line. Likewise, the operating mode is shifted between the HV-High mode and the fixed mode when the operating point is shifted across the "Fix↔High".

In the maps shown in FIGS. 13 and 14, the regions of each of the operating mode and the lines defining the regions may be altered depending on temperatures of the members of the first drive unit 2, the electric storage unit 47, the power control systems 44, 45, and 46, and an SOC level of the electric storage unit 47.

As indicated in the foregoing nomographic diagrams, when shifting the operating mode from the EV mode to the HV mode, the first motor 6 cranks the engine 5 while regenerating electricity. As described, electric power generation resulting from cranking the engine 5 by the first motor 6 in the EV-Low mode is greater than electric power generation resulting from cranking the engine 5 by the first motor 6 in the EV-High mode. Specifically, electric power generation by the first motor 6 may be calculated by multiplying a rotational speed of the first motor 6 by a torque of the first motor 6. However, an input power to the electric storage unit 47 may be restricted e.g., in a case that an SOC level of the electric storage unit 47 is higher than a predetermined level, or that a temperature of the electric storage unit 47 is lower than a predetermined level. In those cases, cranking of the engine 5 may not be executed promptly by the first motor 6 in the EV-Low mode. In order to start the engine 5 promptly in response to an engine starting demand, the control system according to the present disclosure is configured to execute the below mentioned routines.

Figure 15:
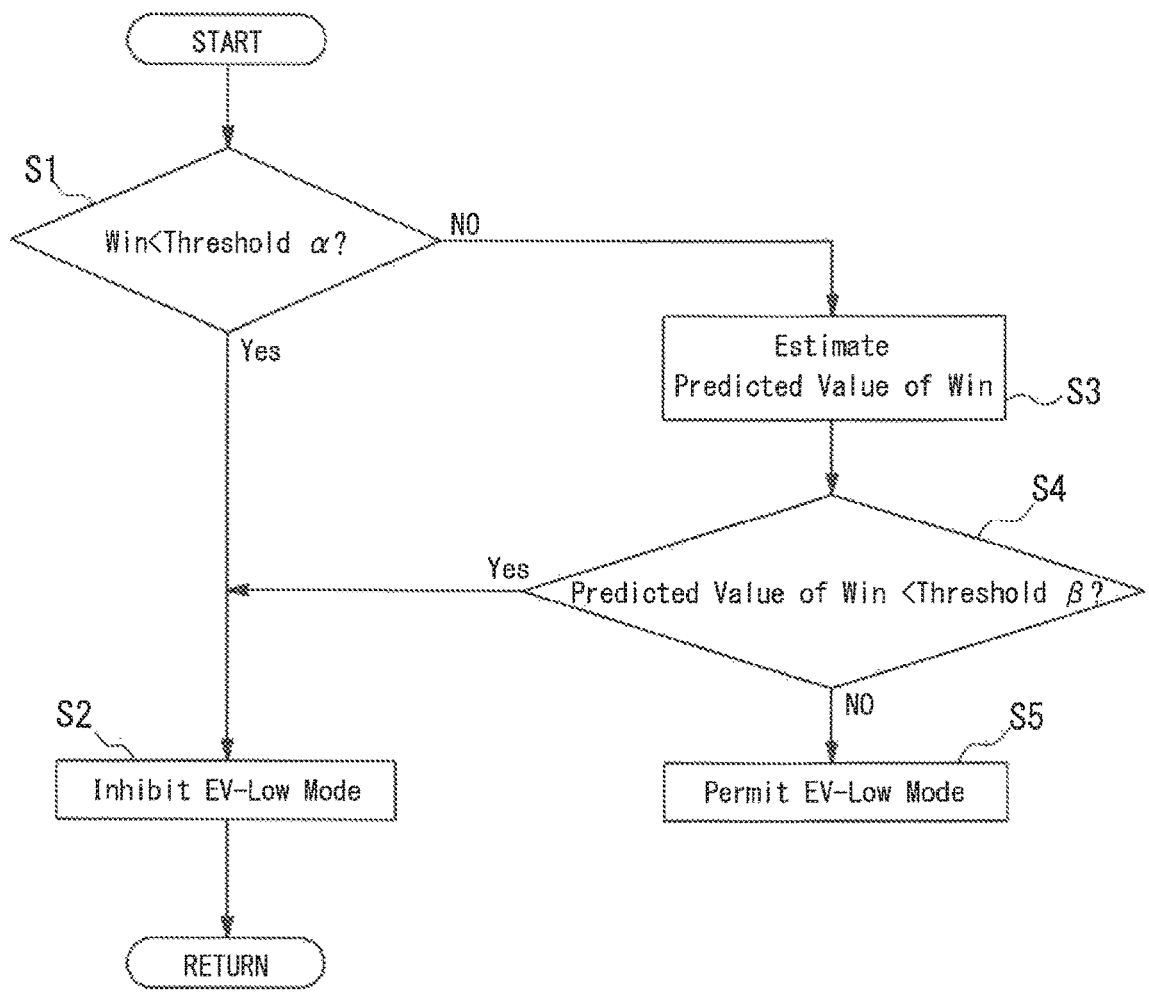
FIG. 15 is a flowchart showing a first example of a routine executed by the control system according to the embodiment.
Figure 16:
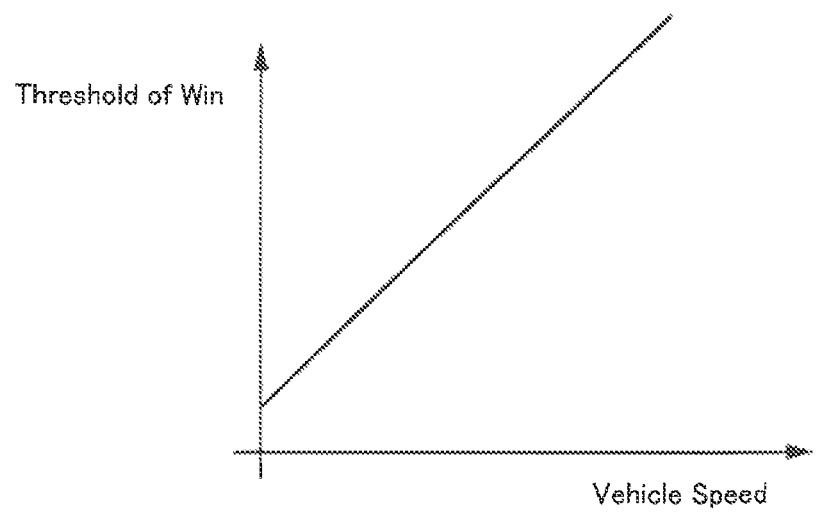
FIG. 16 is a graph indicating a relation between a vehicle speed and a threshold value of an input power.

Turning to FIG. 15, there is shown the first example of the routine to be executed during propulsion in the EV mode by the ECU 48. At step S1, it is determined whether an acceptable input power Win to the electric storage unit 47 is smaller than a threshold value α as a first threshold value. Specifically, the threshold value α of the acceptable input power Win is set to a value possible to start the engine 5 by the first motor 6 in the EV-Low mode. In other words, the threshold value α of the acceptable input power Win is set to the electric power to be generated as a result of cranking the engine 5 by the first motor 6 in the EV-Low mode. That is, it is determined at step S1 whether the acceptable input power Win to the electric storage unit 47 is smaller than the electric power to be generated as a result of cranking the engine 5 by the first motor 6 in the EV-Low mode.

As indicated in FIG. 13, the threshold value α of the acceptable input power Win increases in proportion to an increase in the vehicle speed. As described, an input power to the electric storage unit 47 may be restricted when the electric storage unit 47 is almost fully charged, or when a temperature of the electric storage unit 47 is close to an upper limit level or a lower limit level. That is, the acceptable input power Win varies sequentially depending on a condition of the electric storage unit 47. If the acceptable input power Win to the electric storage unit 47 is smaller than the electric power to be generated as a result of cranking the engine 5 by the first motor 6 in the EV-Low mode (i.e., the threshold value α) so that the answer of step S1 is YES, the routine progresses to step S2 to inhibit selection of the EV-Low mode. In this case, the engine 5 is to be started by the first motor 6 in the EV-High in response to the engine starting demand. Thereafter, the routine returns.

By contrast, if the acceptable input power Win to the electric storage unit 47 is greater than the threshold value α so that the answer of step S1 is NO, the routine progresses to step S3 to estimate a predicted value of the acceptable input power Win in the future. As described, the acceptable input power Win varies sequentially even when shifting the operating mode. Therefore, if the acceptable input power Win is expected to decrease during execution of a shifting operation of the operating mode scheduled e.g., by a navigation system, the engine 5 will not be allowed to be started in the EV-Low mode. In order to avoid such disadvantage, at step S3, a change in the acceptable input power Win given that the operating mode is shifted from the EV mode to the HV mode in the future is estimated. For example, the predicted value of the acceptable input power Win may be estimated based on a road condition of a planned route according to a travel plan created by the navigation system, an estimated regeneration amount of electricity to a point where the scheduled shifting operation of the operating mode will take place, while taking account of an aging deterioration of the electric storage unit 47 due to e.g., lithium deposition. Specifically, an occurrence of the lithium deposition may be determined based on a charging duration of the electric storage unit 47, an integrated current value supplied to the electric storage unit 47, a decelerating duration and so on.

Then, it is determined at step S4 whether the predicted value of the acceptable input power Win estimated at step S3 is smaller than a threshold value β as a second threshold value. Specifically, the threshold value β also increases in proportion to an increase in a speed of the vehicle Ve, and is set to a value calculated by adding an estimate error to the electric power to be generated as a result of cranking the engine 5 by the first motor 6 in the EV-Low mode. That is, the threshold value β is greater than the threshold value α (β>α). If the predicted value of the acceptable input power Win is smaller than the threshold value β so that the answer of step S4 is YES, the routine also progresses to step S2 to inhibit selection of the EV-Low mode. In this case, it is expected that the acceptable input power Win to the electric storage unit 47 will be reduced smaller than the threshold value β (or the threshold value α) during shifting the operating mode to the HV mode, therefore, the EV-Low mode is inhibited. In this case, therefore, the engine 5 is to be cranked by the first motor 6 in the EV-High mode as necessary, even if the vehicle speed is reduced so that the operating point falls within the region where the EV-Low mode is selected.

By contrast, if the predicted value of the acceptable input power Win is greater than the threshold value β so that the answer of step S4 is NO, the routine progresses to step S5 to permit selection of the EV-Low mode. In this case, the engine 5 is to be started by the first motor 6 in the EV-Low mode in response to the engine starting demand. Thereafter, the routine returns.

Figure 17:
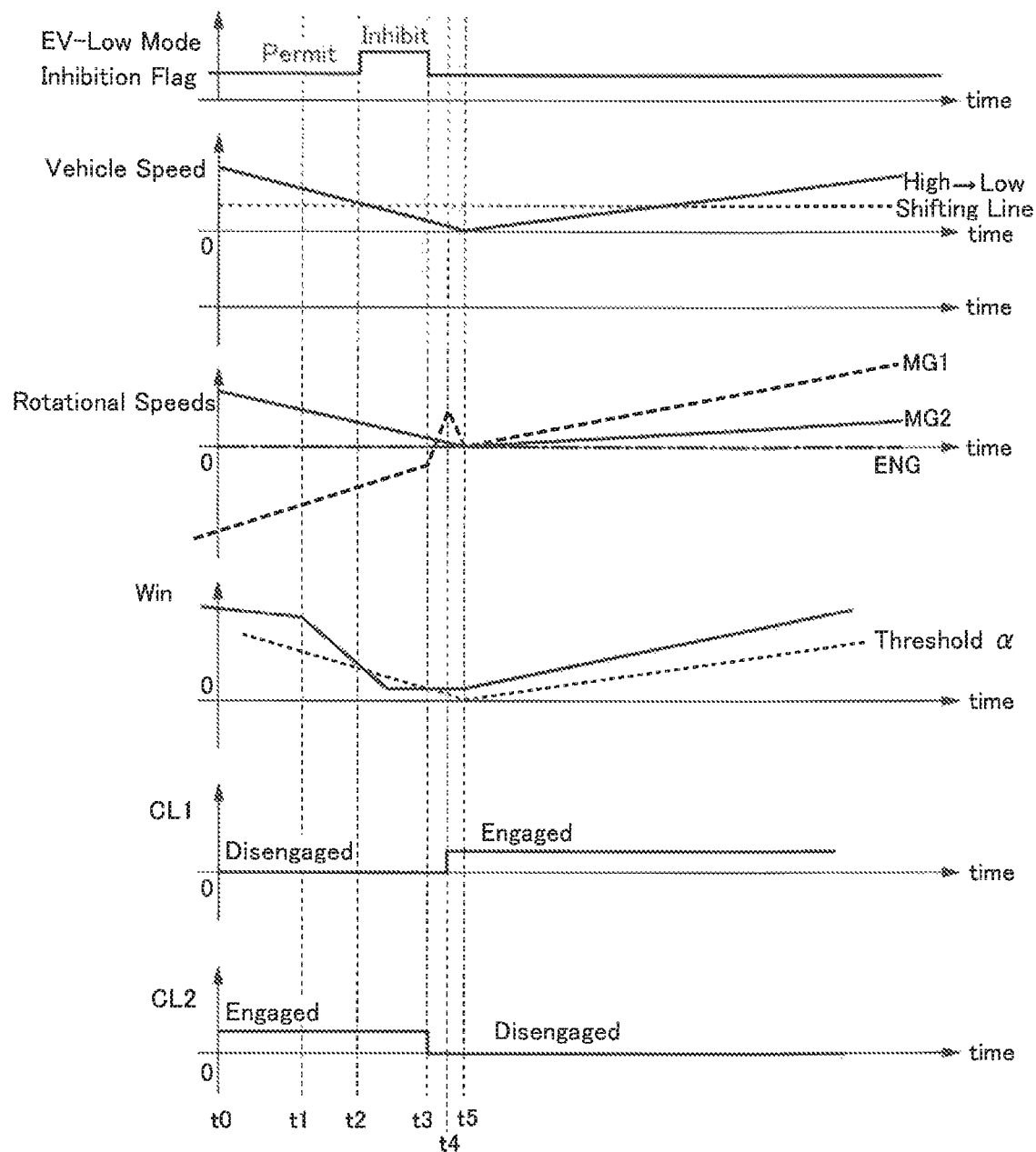
FIG. 17 is a time chart indicating temporal changes in conditions of the hybrid vehicle during execution of the routine shown in FIG. 15.

Turning to FIG. 17, there are shown temporal changes in the conditions of the vehicle Ve during execution of the routine shown in FIG. 15 to selectively inhibit selection of the EV-Low mode while decelerating the vehicle Ve in the EV-High mode.

At point t0, the vehicle speed falls within a range where the EV-High mode is selected, and the acceptable input power Win is still greater than the threshold value α. In this situation, an EV-Low mode inhibition flag is still turned off, in other words, selection of the EV-Low mode is still permitted. Since the vehicle Ve is propelled in the EV-High mode, at point t0, the first clutch CL1 is engaged and the second clutch CL2 is disengaged. In this situation, a rotational speed of the engine 5 is zero, a rotational speed of the second motor 7 serving as a drive motor is reduced with a reduction in the vehicle speed, and the first motor 6 is rotated in a reverse direction while generating torque.

In this situation, since the vehicle Ve is decelerated, the electric storage unit 47 is charged with the regenerated electricity. Consequently, at point t1, the electric storage unit 47 is almost fully charged, and the acceptable input power Win to the electric storage unit 47 is decreased. Then, at point t2, the vehicle speed falls below a shifting line to shift the operating mode from the EV-High mode to the EV-Low mode. In this situation, however; the acceptable input power Win is reduced smaller than the threshold value $\alpha$. Consequently, in order to prevent execution of cranking of the engine 5 in the EV-Low mode if the engine 5 is required to be started, the EV-Low mode inhibition flag is turned on. That is, the EV-High mode is continued, and the engine 5 will be started by the first motor 6 in the EV-High mode if it is required to be started. In this situation, as indicated in FIG. 17, the threshold value $\alpha$ varies in a similar fashion (or in proportion) to the change in the vehicle speed.

When the threshold value $\alpha$ being reduced with the reduction in the vehicle speed falls below the acceptable input power Win to the electric storage unit 47 at point t3, the EV-Low mode inhibition flag is turned off again to allow selection of the EV-Low mode. In this situation, the second clutch CL2 is disengaged so that the vehicle Ve is brought into the neutral stage, and then the first clutch CL1 is engaged at point t4 to establish the EV-Low mode. At the same time, in order to reduce an engagement shock of the first clutch CL1, the first motor 6 is controlled in such a manner as to reduce a speed difference between an input member and an output member of the first clutch CL1 to a synchronous speed.

According to the example shown in FIG. 17, the vehicle speed is reduced to zero at point t5, that is, the vehicle Ve is stopped at point t5. At point t5, therefore, the rotational speeds of the engine 5, the first motor 6, and the second motor 7 are reduced to zero, respectively, and the threshold value $\alpha$ is also reduced to zero. Then, when the accelerator pedal is depressed again, the vehicle speed is increased, and the rotational speeds of the first motor 6 and the second motor 7, and the threshold value $\alpha$ are changed in accordance with an increase in the vehicle speed.

Although not especially shown in FIG. 17, the predicted value of the acceptable input power Win to the electric storage unit 47 may be estimated when the acceptable input power Win is greater than the threshold value $\alpha$. In this case, the threshold value $\beta$ set taking account of the estimated error is employed, and the EV-Low mode inhibition flag is turned on when the predicted value of the acceptable input power Win falls below the threshold value $\beta$.

Thus, according to the embodiment of the present disclosure, the EV-Low mode is inhibited depending on the condition of the electric storage unit 47, even if the vehicle speed falls below the shifting line to shift the operating mode from the EV-High mode to the EV-Low mode. Specifically, when the acceptable input power Win to the electric storage unit 47 is smaller than the electric power to be generated by cranking the engine 5 by the first motor 6 in the EV-Low mode, the EV-Low mode is inhibited and the EV-High mode is continued even if the vehicle speed being reduced falls within the range where the EV-Low mode is selected.

Therefore, if the engine 5 is required to be started in this situation, the engine 5 is to be started in the EV-High mode in which electric power generation is smaller than that in the EV-Low mode. For this reason, the engine 5 is allowed to be cranked promptly without damaging the electric storage unit 47.

In addition, the EV-Low mode may also be inhibited selectively based on the predicted value of the acceptable input power Win to the electric storage unit 47. Specifically, the EV-Low mode may be inhibited when the predicted value of the acceptable input power Win falls below the threshold value $\beta$. Therefore, if the engine 5 is required to be started in the future, the engine 5 will be started in the EV-High mode in which electric power generation is smaller than that in the EV-Low mode. For this reason, the engine 5 will be cranked promptly without damaging the electric storage unit 47.

Here will be explained the second example of the routine executed by the control system according to the embodiment with reference to FIG. 18. According to the example shown in FIG. 18, the operating mode is shifted compulsory to the EV-High mode if the acceptable input power Win to the electric storage unit 47 falls below the threshold value $\alpha$ or $\beta$ in a transient state of shifting the operating mode from the EV-High mode to the EV-Low mode.

At step S100, it is determined whether the acceptable input power Win to the electric storage unit 47 in the transient state of shifting the operating mode from the EV-High mode to the EV-Low mode is smaller than the threshold value $\alpha$. That is, in the transient state of shifting the operating mode from the EV-High mode to the EV-Low mode, it is determined whether the current acceptable input power Win is smaller than the electric power to be generated as a result of cranking the engine 5 by the first motor 6 in the EV-Low mode. If the acceptable input power Win to the electric storage unit 47 is smaller than the threshold value $\alpha$ so that the answer of step S100 is YES, the routine progresses to step S110 to shift the operating mode compulsory to the EV-High mode. In other words, the shifting operation to the EV-Low mode is cancelled and the operating mode is returned to the EV-High mode. Thereafter, the routine returns.

By contrast, if the acceptable input power Win to the electric storage unit 47 is greater than the threshold value $\alpha$ so that the answer of step S100 is NO, the routine progresses to step S120 to estimate a predicted value of the acceptable input power Win in the future. As described, the predicted value of the acceptable input power Win may be estimated based on a road condition of the planned route according to the travel plan created by the navigation system, an estimated regeneration amount, an aging deterioration of the electric storage unit 47 and so on. Then, it is determined at step S130 whether the predicted value of the acceptable input power Win estimated at step S120 is smaller than the threshold value $\beta$. As described, the threshold value $\beta$ is calculated taking account of an estimated error, and hence it is greater than the threshold value $\alpha$.

If the predicted value of the acceptable input power Win in the transient state of shifting the operating mode from the EV-High mode to the EV-Low mode is smaller than the threshold value $\beta$ so that the answer of step S130 is YES, the routine also progresses to step S110 to shift the operating mode compulsory to the EV-High mode. In other words, the operating mode is returned to the EV-High mode. Thereafter, the routine returns. By contrast, if the predicted value of the acceptable input power Win is greater than the threshold value β so that the answer of step S130 is NO, the routine returns. In this case, the operating mode is shifted to the EV-Low mode.

Figure 18:
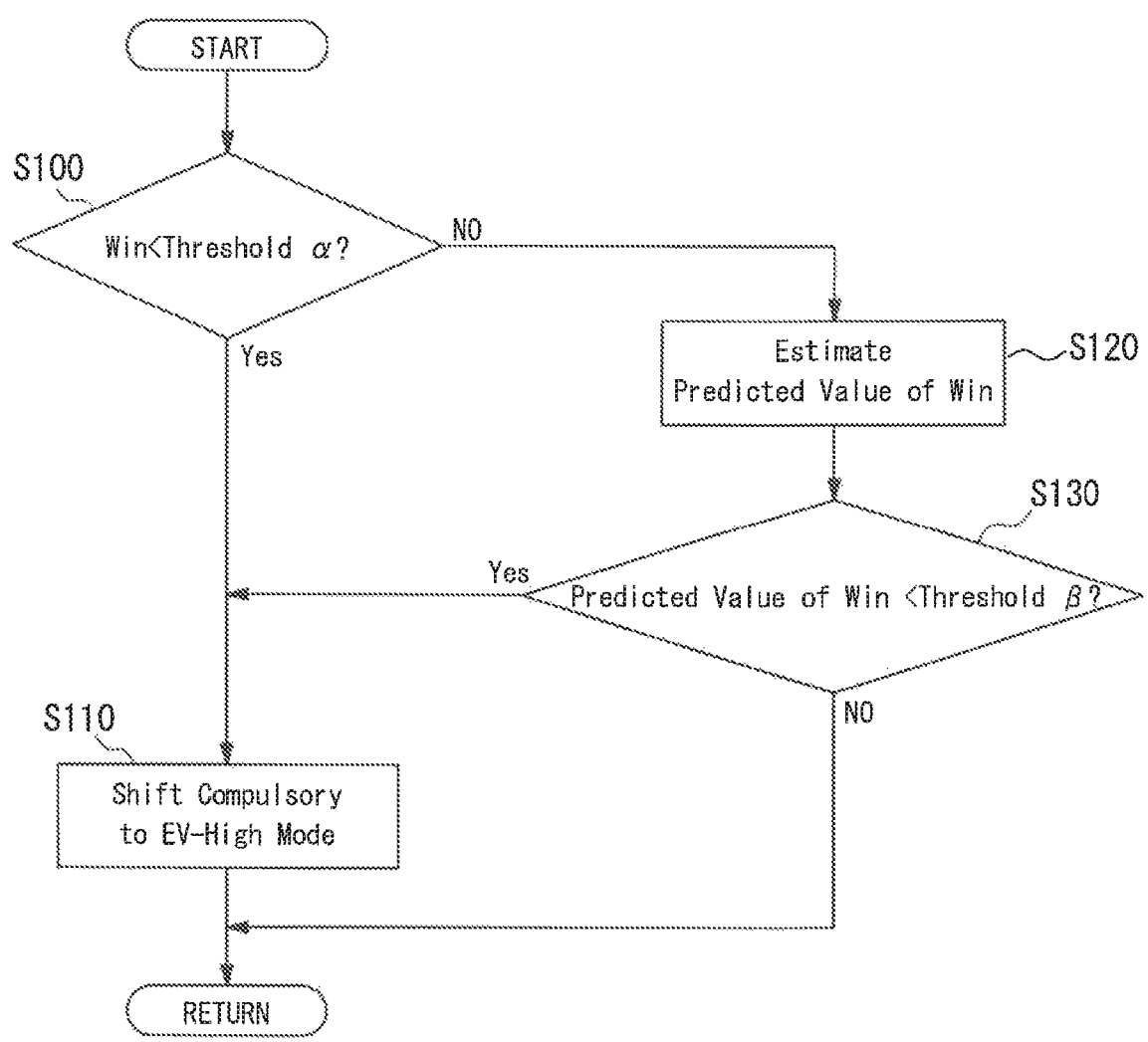
FIG. 18 is a flowchart showing a second example of a routine executed by the control system according to the embodiment.
Figure 19:
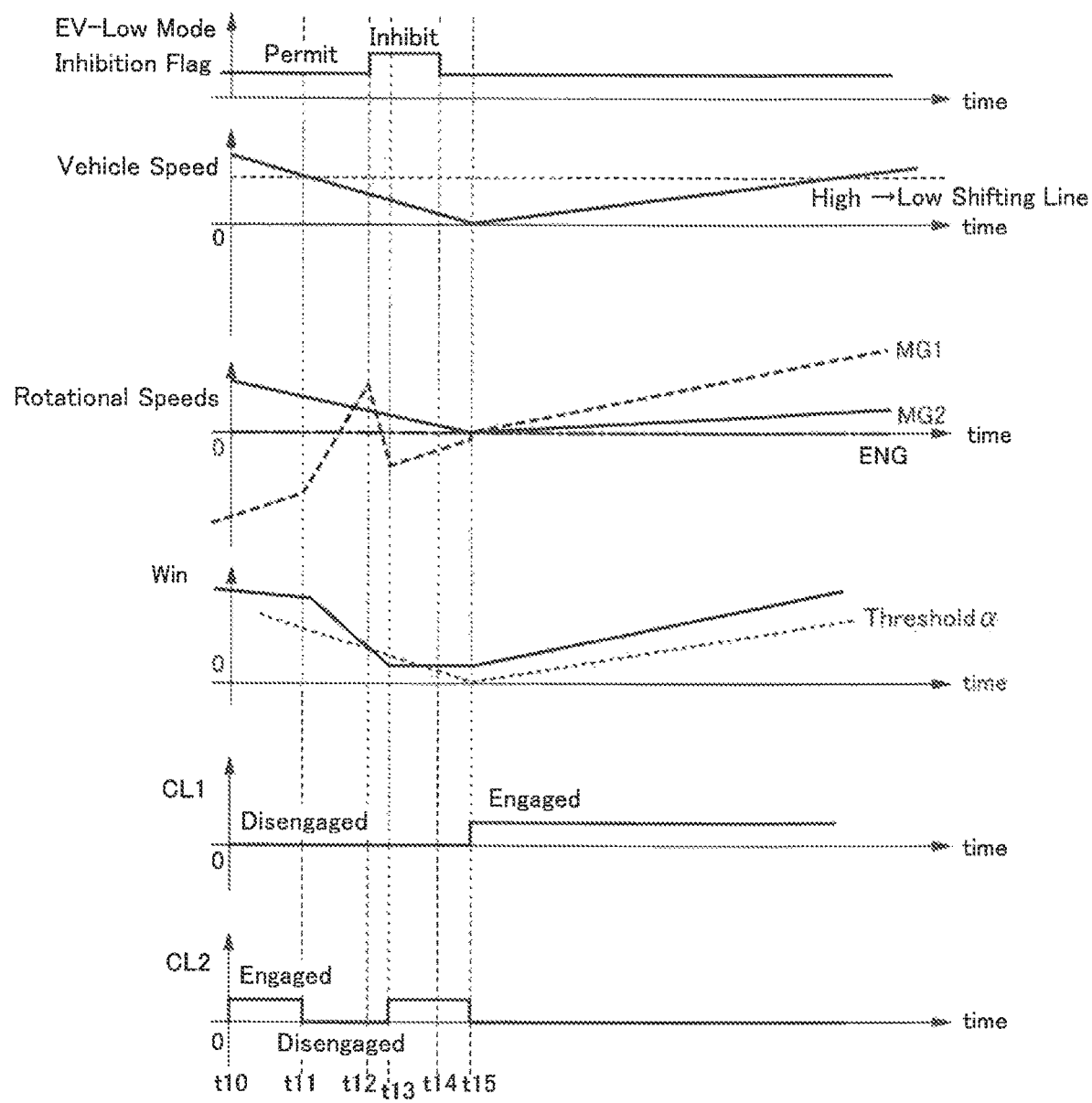
FIG. 19 is a time chart indicating temporal changes in conditions of the hybrid vehicle during execution of the routine shown in FIG. 18.

Turning to FIG. 19, there are shown temporal changes in the conditions of the vehicle Ve during execution of the routine shown in FIG. 18 in the transient state of shifting the operating mode from the EV-High mode to the EV-Low mode.

At point t10, the vehicle Ve is propelled in the EV-High mode in which the first clutch CL1 is disengaged and the second clutch CL2 is engaged. In this situation, the acceptable input power Win to the electric storage unit 47 is still greater than the threshold value α, and hence the EV-Low mode inhibition flag is turned off. That is, selection of the EV-Low mode is still permitted.

Then, at point t11, the vehicle speed falls below the shifting line to shift the operating mode from the EV-High mode to the EV-Low mode. Consequently, in order to shift the operating mode from the EV-High mode to the EV-Low mode, the second clutch CL2 is disengaged while controlling the first motor 6 in such a manner as to change the rotational direction from the reverse direction to the forward direction for the preparation to engage the first clutch CL1.

During the transient state of shifting the operating mode from the EV-High mode to the EV-Low mode, the acceptable input power Win to the electric storage unit 47 falls below the threshold value α at point t12, and the EV-Low mode inhibition flag is turned on. Consequently, selection of the EV-Low mode is inhibited, and the operating mode is compulsory returned to the EV-High mode while controlling the first motor 6 in such a manner as to reduce a speed difference between an input member and an output member of the second clutch CL2. Then, when the speed difference between the input member and the output member of the second clutch CL2 is reduced to a synchronous speed at point t13, the second clutch CL2 is engaged. Thus, according to the example shown in FIG. 19, the operating mode is compulsory returned to the EV-High mode during the transient state of shifting the operating mode from the EV-High mode to the EV-Low mode. In this situation, if the engine 5 is cranked by the first motor 6, electricity will be regenerated by the first motor 6. However; electric power generation in the EV-High mode is smaller than electric power generation in the EV-Low mode. When cranking the engine 5, specifically, the first motor 6 generates a torque taking account of an inertia and a friction torque of the engine 5. Consequently, relatively larger electric power is generated by the first motor 6. Therefore, if the acceptable input power Win to the electric storage unit 47 is smaller than the threshold value α during the transient state of shifting the operating mode from the EV-High mode to the EV-Low mode, the operating mode is returned compulsory to the EV-high mode in which electric power generation is relatively smaller.

Then, when the threshold value α being reduced with the reduction in the vehicle speed falls below the acceptable input power Win to the electric storage unit 47 at point t14, the EV-Low mode inhibition flag is turned off again to allow selection of the EV-Low mode. According to the example shown in FIG. 19, however, the first clutch CL1 will not be engaged immediately to shift the operating mode to the EV-Low mode. That is, according to the example shown in FIG. 19, it is expected that the speed of the vehicle Ve will be reduced to zero at point 15. In other words, the vehicle Ve is expected to stop at point t15. Therefore, in order to reduce an engagement shock of the first clutch CL1, the operating mode is shifted to the EV-Low mode after stopping the vehicle Ve. In this situation, since the vehicle Ve stops, the electricity will not be regenerated and hence the SOC level of the electric storage unit 47 will not be raised.

For these reasons, the first clutch CL1 is engaged and the second clutch CL2 is disengaged after stopping the vehicle Ve at point t15. Then, when the accelerator pedal is depressed again, the vehicle speed is increased again, and the rotational speeds of the first motor 6 and the second motor 7, and the threshold value α are changed in accordance with an increase in the vehicle speed. Although not especially shown in FIG. 19, the predicted value of the acceptable input power Win to the electric storage unit 47 may also be estimated when the acceptable input power Win is greater than the threshold value α. In this case, the threshold value β set taking account of the estimated error is employed, and the EV-Low mode inhibition flag is turned on when the predicted value of the acceptable input power Win falls below the threshold value β.

Thus, according to the examples shown in FIGS. 18 and 19, the operating mode is shifted compulsory to the EV-High mode if the acceptable input power Win to the electric storage unit 47 falls below the threshold value α or β3 in the transient state of shifting the operating mode from the EV-High mode to the EV-Low mode. Therefore, if the engine 5 is required to be started during the transient state of shifting the operating mode from the EV-High mode to the EV-Low mode, the engine 5 will be started in the EV-High mode in which electric power generation is relatively smaller. For this reason, the engine 5 is allowed to be started promptly without damaging the electric storage unit 47 even if the acceptable input power Win to the electric storage unit 47 is smaller than the threshold value α or β.

Here will be explained the third example of the routine executed by the control system according to the embodiment with reference to FIG. 20. According to the example shown in FIG. 20, the electricity is transferred between the high-output type storage device 47a and the large-capacity type storage device 47b when the acceptable input power Win falls below the threshold value α.

At step S200, it is determined whether the acceptable input power Win to e.g., the high-output type storage device 47a is smaller than the threshold value α. That is, it is determined at step S200 whether the acceptable input power Win to the high-output type storage device 47a is smaller than the electric power to be generated as a result of cranking the engine 5 by the first motor 6 in the EV-Low mode. If the acceptable input power Win to the high-output type storage device 47a is greater than the threshold value α so that the answer of step S200 is NO, the routine returns.

By contrast, if the acceptable input power Win to the high-output type storage device 47a is smaller than the threshold value α so that the answer of step S200 is YES, the routine progresses to step S210 to supply the electricity accumulated in the high-output type storage device 47a to the large-capacity type storage device 47b, and thereafter returns. As described, the engine 5 may not be started promptly by the first motor 6 if the acceptable input power Win to the electric storage unit 47 is smaller than the threshold value. In order to avoid such disadvantage, if the acceptable input power Win to one of the storage devices 47a and 47b is smaller than the threshold value, the electricity accumulated in one of the storage devices 47a and 47b is transferred to the other one of the storage devices 47a and 47b thereby increasing the acceptable input power Win.

Figure 20:
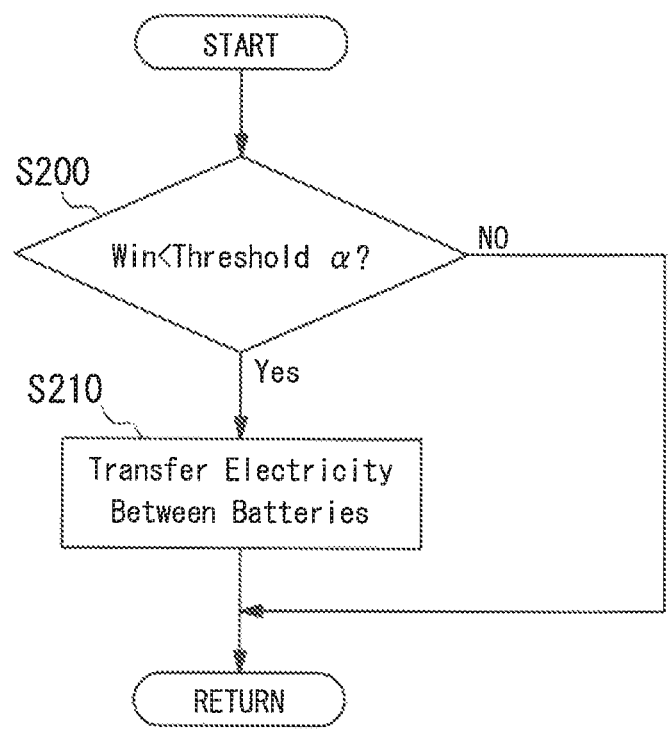
FIG. 20 is a flowchart showing a third example of a routine executed by the control system according to the embodiment.
Figure 21:
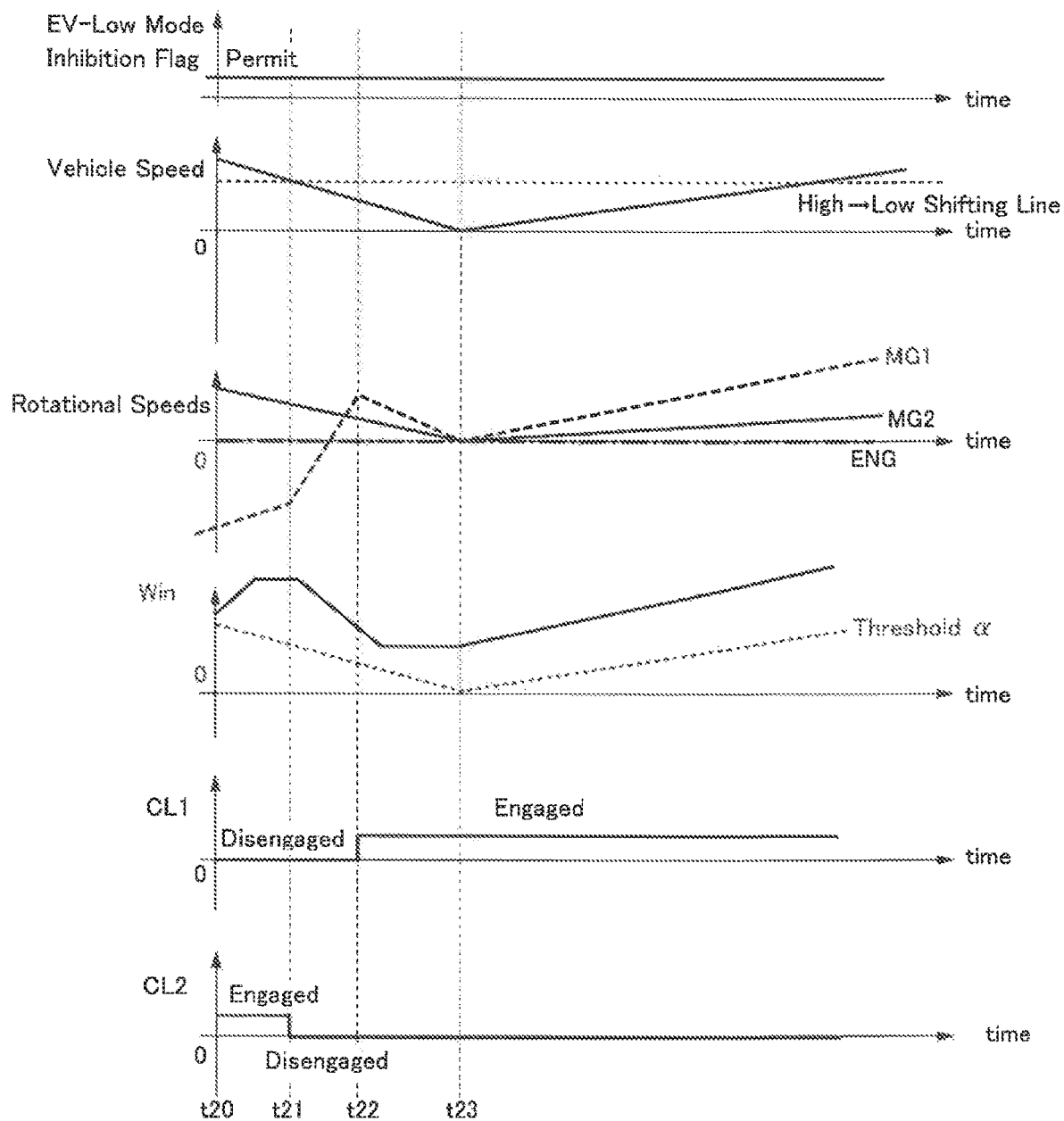
FIG. 21 is a time chart indicating temporal changes in conditions of the hybrid vehicle during execution of the routine shown in FIG. 20.

Turning to FIG. 21, there are shown temporal changes in the conditions of the vehicle Ve during execution of the routine shown in FIG. 20 while decelerating the vehicle Ve in the EV-High mode.

When the acceptable input power Win to the high-output type storage device 47a falls below the threshold value α, the engine 5 may not be started promptly in response to the engine starting demand. In order to avoid such disadvantage, at point t20, the electricity accumulated in the high-output type storage device 47a is supplied to the large-capacity type storage device 47b. In other words, the electricity accumulated in the high-output type storage device 47a is transferred to the large-capacity type storage device 47b. Consequently, the acceptable input power Win to the high-output type storage device 47a is increased so that the EV-Low mode inhibition flag is turned off. In this situation, the vehicle speed still falls within the range where the EV-High mode is selected, and the vehicle Ve is propelled in the EV-High mode while disengaging the first clutch CL1 and engaging the second clutch CL2.

Then, at point t21, the vehicle speed falls below the shifting line to shift the operating mode from the EV-High mode to the EV-Low mode. Consequently, in order to shift the operating mode from the EV-High mode to the EV-Low mode, the second clutch CL2 is disengaged while controlling the first motor 6 in such a manner as to reduce a speed difference between the input member and the output member of the first clutch CL1. Thereafter, when the speed difference between the input member and the output member of the first clutch CL1 is reduced to a synchronous speed at point t22, the first clutch CL1 is engaged. In this situation, if the engine 5 is cranked by the first motor 6, electricity will be regenerated by the first motor 6. According to the example shown in FIG. 21, however, the acceptable input power Win to the electric storage unit 47 is not reduced smaller than the threshold value. Therefore, the EV-Low mode inhibition flag is turned off throughout the execution of the routine shown in FIG. 20. That is, the engine 5 can be started in the EV-Low mode as necessary.

The vehicle speed is reduced to zero at point t23, and when the accelerator pedal is depressed, the vehicle speed is increased, and the rotational speeds of the first motor 6 and the second motor 7, and the threshold value α are changed in accordance with an increase in the vehicle speed. Although not especially shown in FIG. 21, the predicted value of the acceptable input power Win to the electric storage unit 47 may also be estimated when the acceptable input power Win is greater than the threshold value α. In this case, the electricity is transferred between the high-output type storage device 47a and the large-capacity type storage device 47b when the predicted value of the acceptable input power Win to the electric storage unit 47 falls below the threshold value β.

Specifically, the electricity is transferred from the high-output type storage device 47a to the large-capacity type storage device 47b when the acceptable input power Win to the high-output type storage device 47a falls below the threshold value α or β. According to the examples shown in FIGS. 20 and 21, therefore, the acceptable input power Win to the electric storage unit 47 will not fall below the threshold value α or β. For this reason, the engine 5 may be started promptly in response to the engine starting demand without damaging the electric storage unit 47.

According to the embodiment of the present disclosure, the EV-Low mode may also be selectively inhibited during propulsion in the EV-Low mode.

Figure 22:
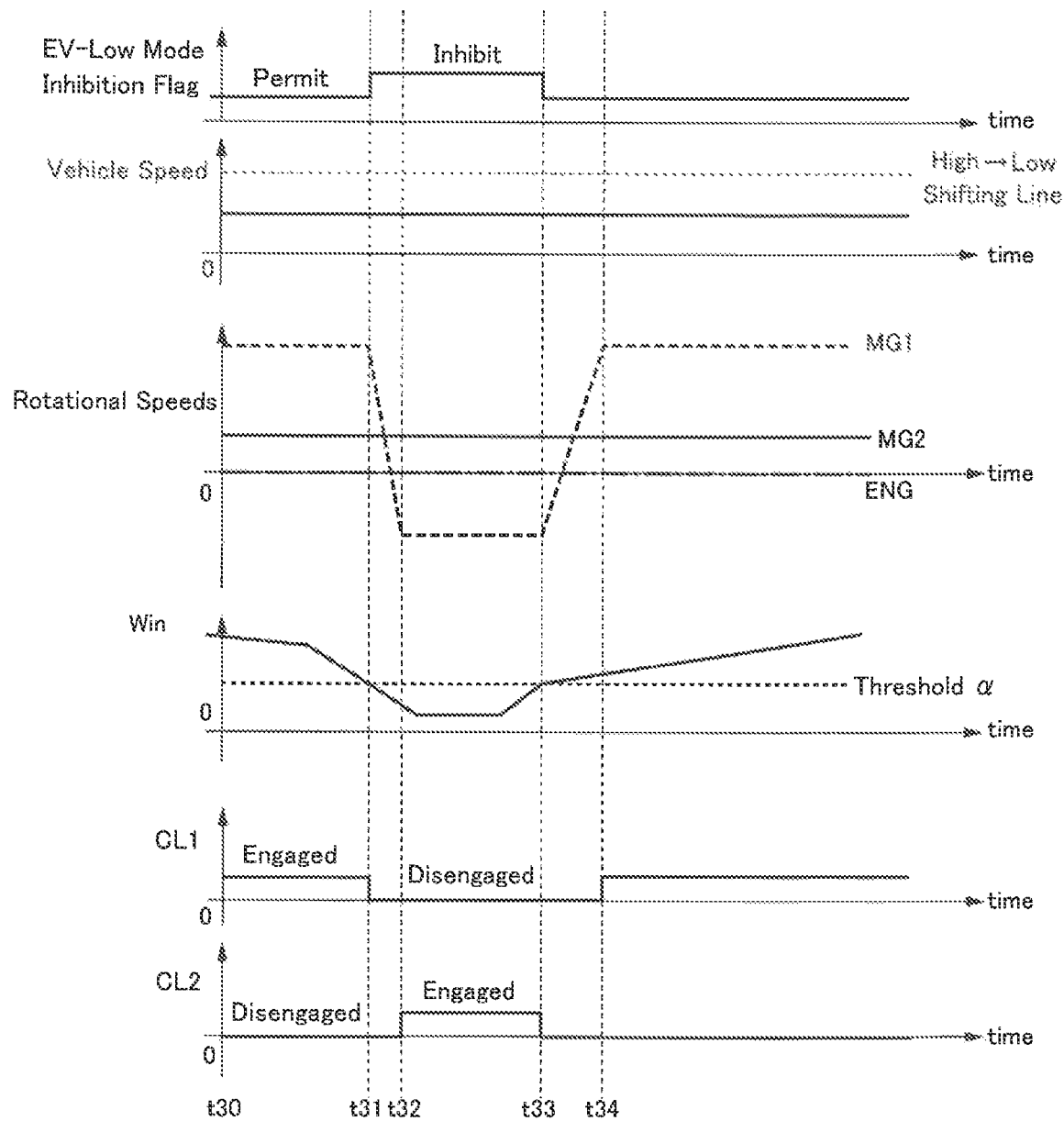
FIG. 22 is a time chart showing temporal changes in the conditions of the vehicle in a case of selectively inhibiting the EV-Low mode during propulsion in the EV-Low mode.

Turning to FIG. 22, there are shown temporal changes in the conditions of the vehicle Ve in the case of selectively inhibiting the EV-Low mode during propulsion in the EV-Low mode at a constant speed. At point t30, the acceptable input power Win to the electric storage unit 47 is still greater than the threshold value α, and hence the EV-Low mode inhibition flag is turned off. Therefore, the vehicle Ve is propelled in the EV-Low mode in which the first clutch CL1 is engaged and the second clutch CL2 is disengaged. In this situation, since the vehicle speed is constant, a speed of the second motor 7 and the threshold value α are also constant.

When the acceptable input power Win falls below the threshold value α at point t31, the EV-Low mode inhibition flag is turned on. Consequently, the first clutch CL1 is disengaged to shift the operating mode to the EV-High mode. At the same time, the first motor 6 is controlled in such a manner as to reduce a speed difference between the input member and the output member of the second clutch CL2. Then, when the speed difference between the input member and the output member of the second clutch CL2 is reduced to the synchronous speed at point t32, the second clutch CL2 is engaged.

In this situation, the SOC level of the electric storage unit 47 falls as a result of propelling the vehicle Ve by the electric power, and at point t33, the acceptable input power Win to the electric storage unit 47 is increased greater than the threshold value α. Consequently, the EV-Low mode inhibition flag is turned off, and the second clutch CL2 is disengaged to shift the operating mode from the EV-High mode to the EV-Low mode. At the same time, the first motor 6 is controlled in such a manner as to reduce a speed difference between the input member and the output member of the first clutch CL1. Then, when the speed difference between the input member and the output member of the first clutch CL1 is reduced to the synchronous speed at point t34, the first clutch CL1 is engaged.

Thus, the EV-Low mode may also be inhibited during propulsion in the EV-Low mode, and the operating mode is shifted to the EV-High mode when the acceptable input power Win to the electric storage unit 47 falls below the threshold value α. Therefore, the engine 5 may be started promptly in response to the engine starting demand without damaging the electric storage unit 47 even if the acceptable input power Win to the electric storage unit 47 falls below the threshold value α. Although not especially shown in FIG. 22, the predicted value of the acceptable input power Win to the electric storage unit 47 may also be estimated when the acceptable input power Win is greater than the threshold value α.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the embodiments may also be applied to a hybrid vehicle shown in FIG. 23.

Figures 23, 24:
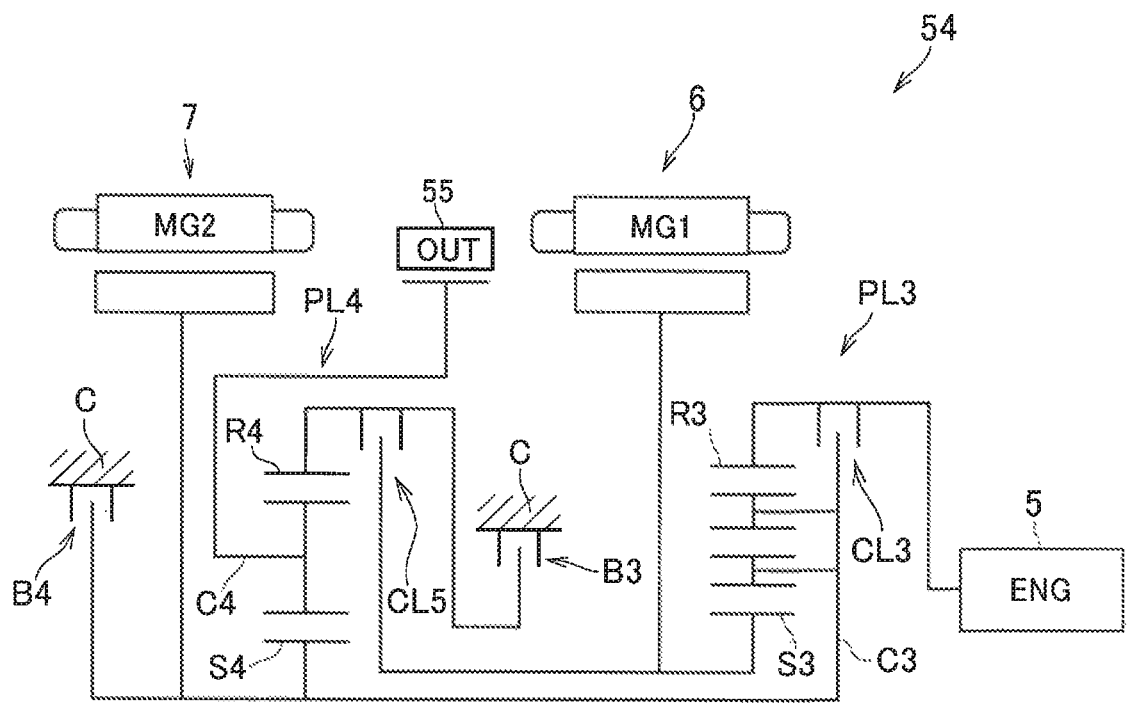
FIG. 23 is a skeleton diagram showing a third drive unit of the hybrid vehicle according to another embodiment of the present disclosure.
FIG. 24 is a table showing engagement states of engagement devices in each operating mode of the hybrid vehicle according to another embodiment.

The vehicle Ve shown in FIG. 23 comprises a third drive unit 54. In the following description, explanations for the elements in common with those in FIG. 1 will be omitted. The third drive unit 54 comprises a complex planetary gear unit including a third planetary gear unit PL3 as a double-pinion planetary gear unit, and a fourth planetary gear unit PL4 as a single-pinion planetary gear unit. In the third drive unit 54, the second motor 7 is connected to an input side of the complex planetary gear unit. Specifically, in the third planetary gear unit PL3, the engine 5 is connected to a ring gear R3, and the first motor 6 is connected to a sun gear S3. On the other hand, in the fourth planetary gear unit PL4, a sun gear S4 is connected to the second motor 7 and a carrier C3 of the third planetary gear unit PL3, and a carrier C4 is connected to an output member 55.

The ring gear R3 and the carrier C3 of the third planetary gear unit PL3 are selectively connected to each other by a fourth clutch CL4, and the sun gear S3 of the third planetary gear unit PL3 and a ring gear R4 of the fourth planetary gear unit PL4 are selectively connected to each other by a fifth clutch CL5. The ring gear R4 of the fourth planetary gear unit PL4 is also connected selectively to a stationary member C such as a casing by a third brake B3, and the sun gear S4 of the fourth planetary gear unit PL4 is also connected selectively to the stationary member C by a fourth brake B4. For example, a frictional engagement device or a dog clutch may also be used as the fourth clutch CL4, the fifth clutch CL5, the third brake B3, and the fourth brake B4.

FIG. 24 shows engagement states of the fourth clutch CL4, the fifth clutch CL5, the third brake B3, and the fourth brake B4 in each operating mode. In FIG. 6, "O" represents that the engagement device is in engagement, and "-" represents the engagement device is in disengagement. As can be seen from FIG. 6, the operating mode of the vehicle Ve having the third drive unit 54 may be selected from a first to sixth operating mode. Specifically, the first operating mode is established by engaging the third brake B3, the second operating mode is established by engaging the fifth clutch CL5, the third operating mode is established by engaging the third brake B3 and the fourth clutch CL4, the fourth operating mode is established by engaging the third brake B3 and the fifth clutch CL5, the fifth operating mode is established by engaging the fourth clutch CL4 and the fifth clutch CL5, and the sixth operating mode is established by engaging the fifth clutch CL5 and the fourth brake B4.

Further, in the examples shown in FIGS. 17 and 21, the first clutch CL1 may also be engaged to shift the operating mode to the EV-Lo mode after the vehicle Ve stops.

What is claimed is:

1. A control system for a hybrid vehicle, comprising:
    an engine;
    a first motor having a generating function;
    a differential mechanism comprising an input element connected to the engine, a reaction element connected to the first motor, and an output element connected to a drive wheel; and
    an electric storage unit in which electricity generated by the first motor is accumulated, wherein:
    an electric vehicle mode can be selected by manipulating the differential mechanism from
        a first electric vehicle mode in which a ratio of a speed of the first motor to a speed of the drive wheel is a first predetermined ratio, and
        a second electric vehicle mode in which a ratio of the speed of the first motor to the speed of the drive wheel is a second predetermined ratio that is smaller than the first predetermined ratio, and
    electric power generation resulting from cranking the engine by the first motor in the first electric vehicle mode is greater than electric power generation resulting from cranking the engine by the first motor in the second electric vehicle mode,
    the first motor cranks the engine by a torque generated while generating the electric power,
    the control system comprising a controller that is configured to:
        select the first electric vehicle mode and the second electric vehicle mode depending on a speed of the hybrid vehicle,
        set, as a threshold value, the electric power to be generated as a result of cranking the engine by the first motor in the first electric vehicle mode in response to an engine starting demand,
        determine whether an acceptable input power to the electric storage unit is smaller than the threshold value, and
        inhibit selection of the first electric vehicle mode if the acceptable input power to the electric storage unit is smaller than the threshold value.

2. The control system for the hybrid vehicle as claimed in claim 1, wherein
    the threshold value includes a first threshold value and a second threshold value,
    the first threshold value is set to a current acceptable input power to the electric storage unit,
    the second threshold value is set to a predicted value of the acceptable input power to the electric storage unit that is greater than the first threshold value,
    the controller is further configured to
        estimate the predicted value of the acceptable input power to the electric storage unit when cranking the engine by the first motor in the first electric vehicle mode or the second electric vehicle mode,
        determine whether the predicted value of the acceptable input power to the electric storage unit is smaller than the second threshold value, and
        inhibit selection of the first electric vehicle mode if the predicted value of the acceptable input power to the electric storage unit is smaller than the second threshold value.

3. The control system for the hybrid vehicle as claimed in claim 1, wherein the controller is further configured to
    shift an operating mode from the first electric vehicle mode to the second electric vehicle mode while inhibiting the selection of the first electric vehicle mode, if the acceptable input power to the electric storage unit during propulsion in the first electric vehicle mode is smaller than the threshold value, and
    maintain the second electric vehicle mode if the acceptable input power to the electric storage unit during propulsion in the second electric vehicle mode is smaller than the threshold value.

4. The control system for the hybrid vehicle as claimed in claim 1, wherein the controller is further configured to:
    determine the acceptable input power to the electric storage unit is smaller than the threshold value in a transient state of shifting an operating mode from the second electric vehicle mode to the first electric vehicle mode, and
    cancel the shifting operation to the first electric vehicle mode while returning the operating mode compulsorily to the second electric vehicle mode, if the acceptable input power to the electric storage unit is smaller than the threshold value.

5. The control system for the hybrid vehicle as claimed in claim 1, wherein
    the electric storage unit includes two types of electric storage devices in which an output density and an energy density are different, and
    the controller is further configured to transfer electricity accumulated in one of the storage devices to the other one of the storage devices, if the acceptable input power to said one of the electric storage devices is smaller than the threshold value when starting the engine.

6. The control system for the hybrid vehicle as claimed in claim 1, wherein the controller is further configured to shift an operating mode to the first electric vehicle mode after the hybrid vehicle stops, when the hybrid vehicle is decelerated so that the operating mode is shifted from the second electric vehicle mode to the first electric vehicle mode.

7. The control system for the hybrid vehicle as claimed in claim 1, wherein the threshold value varies in proportion to a change in the speed of the hybrid vehicle.

8. The control system for the hybrid vehicle as claimed in claim 1, wherein the hybrid vehicle further comprises:
- a second motor connected to the drive wheel in a torque transmittable manner,
- wherein the differential mechanism comprises
    - a first planetary gear unit that performs a differential action among a first input element, a first reaction element, and a first output element,
    - a second planetary gear unit that performs a differential action among a second input element, a second reaction element, and a second output element,
    - a first engagement device that selectively connects the first input element and the second input element,
    - a second engagement device that selectively connects at least two elements of the second planetary gear unit to rotate the second planetary gear unit integrally, and
    - a third engagement device that stops a rotation of the first input element,
- the first input element is connected to the engine,
- the first reaction element is connected to the first motor,
- the first output element is connected to the second input element, and
- the second output element is connected to a member of the drive wheel side.

* * * * *